US008736894B2

(12) United States Patent
Kuo et al.

(10) Patent No.: US 8,736,894 B2
(45) Date of Patent: May 27, 2014

(54) PRODUCING CORRECTION DATA FOR PRINTER

(75) Inventors: Chung-Hui Kuo, Fairport, NY (US); Hwai-Tzuu Tai, Rochester, NY (US); Stacy M. Munechika, Fairport, NY (US); Jerry Eugene Livadas, Webster, NY (US)

(73) Assignee: Eastman Kodak Company, Rochester, NY (US)

( * ) Notice: Subject to any disclaimer, the term of this patent is extended or adjusted under 35 U.S.C. 154(b) by 182 days.

(21) Appl. No.: 13/331,075

(22) Filed: Dec. 20, 2011

(65) Prior Publication Data

US 2013/0155422 A1    Jun. 20, 2013

(51) Int. Cl.
*G06K 15/02* (2006.01)

(52) U.S. Cl.
USPC ......... 358/1.2; 358/2.99; 358/3.01; 358/3.21; 358/3.24; 358/3.26

(58) Field of Classification Search
USPC ................ 358/1.2–1.8, 3.25–3.27, 1.9–3.24; 385/162–167, 312–324
See application file for complete search history.

(56) References Cited

U.S. PATENT DOCUMENTS

| | | | | |
|---|---|---|---|---|
| 5,243,668 A * | 9/1993 | Kitamura et al. | ............ | 382/256 |
| 5,384,648 A * | 1/1995 | Seidner et al. | ................ | 358/534 |
| 5,546,165 A | 8/1996 | Rushing et al. | | |
| 6,885,833 B2 | 4/2005 | Stelter et al. | | |
| 7,058,325 B2 | 6/2006 | Hamby et al. | | |
| 7,236,629 B2 * | 6/2007 | Cooper et al. | ................ | 382/171 |
| 7,382,507 B2 * | 6/2008 | Wu | ............... | 358/523 |
| 7,400,339 B2 | 7/2008 | Sampath et al. | | |
| 7,755,799 B2 | 7/2010 | Paul et al. | | |
| 7,822,287 B2 * | 10/2010 | Frank | .............. | 382/260 |
| 7,855,806 B2 * | 12/2010 | Paul et al. | ....... | 358/1.9 |
| 8,164,967 B2 * | 4/2012 | Byom et al. | .................. | 365/222 |
| 8,320,013 B2 * | 11/2012 | Mongeon et al. | ........... | 358/1.18 |
| 8,355,594 B2 | 1/2013 | Noda | ............. | 382/260 |
| 8,355,639 B2 * | 1/2013 | Paul et al. | ....... | 399/15 |
| 8,441,697 B2 * | 5/2013 | Fletcher et al. | ............... | 358/474 |
| 2005/0275855 A1 * | 12/2005 | Mizes et al. | ................... | 358/1.9 |
| 2005/0280849 A1 * | 12/2005 | Kojima et al. | ................ | 358/1.9 |
| 2009/0083042 A1 * | 3/2009 | Suwabe | ....................... | 704/500 |
| 2010/0053382 A1 * | 3/2010 | Kuniba | ........................ | 348/242 |
| 2010/0097657 A1 * | 4/2010 | Kuo et al. | ..................... | 358/3.01 |
| 2010/0135575 A1 * | 6/2010 | Guo et al. | .................... | 382/164 |
| 2010/0315685 A1 * | 12/2010 | Zaima | ........................ | 358/3.26 |
| 2011/0019933 A1 * | 1/2011 | Noda | .............................. | 382/260 |
| 2011/0242551 A1 * | 10/2011 | Furukawa | ....................... | 358/1.2 |
| 2012/0057885 A1 * | 3/2012 | Paul et al. | ....................... | 399/15 |
| 2012/0251141 A1 * | 10/2012 | Henderson et al. | ............ | 399/49 |

* cited by examiner

*Primary Examiner* — Vu B Hang
*Assistant Examiner* — Kevin Ky
(74) *Attorney, Agent, or Firm* — Kevin E Spaulding

(57) ABSTRACT

Correction data is produced for density errors in prints produced using a printer. While printing a test image, the periods of rotation of one or more rotatable imaging members arranged along a receiver feed path in the printer are measured using respective period sensors. The printed test image is measured along a selected measurement direction and a reproduction error signal representing deviation from aim density is determined. For each period sensor, the autocorrelation of the reproduction error signal for the corresponding period is determined. If the determined autocorrelation exceeds a selected threshold, the reproduction error signal is decomposed at the corresponding period to extract the variation from the measured component. The remaining error signal is separated by frequency terms. The variations from the data at measured periods and the remaining error signal are used to produce a correction signal.

15 Claims, 9 Drawing Sheets

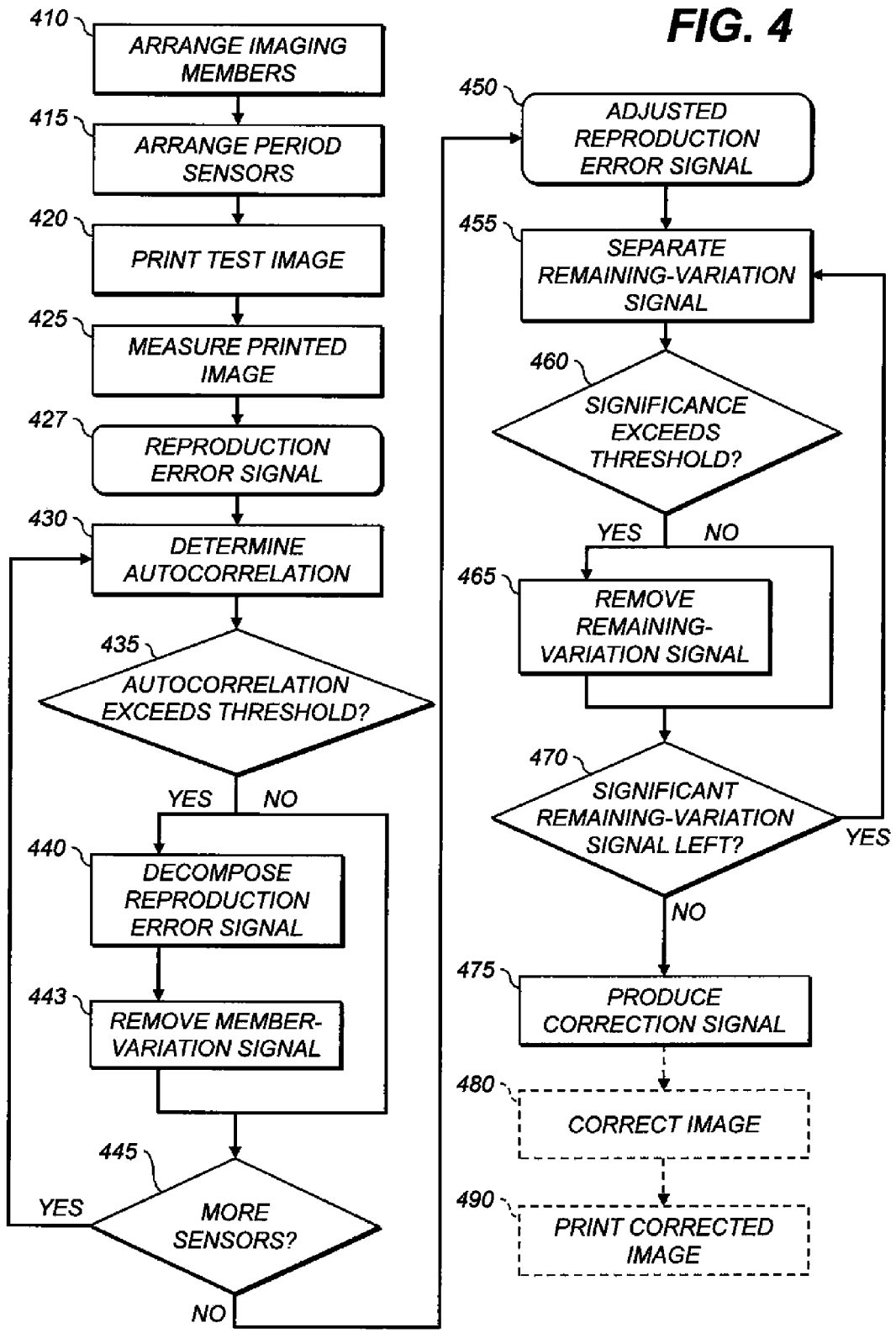

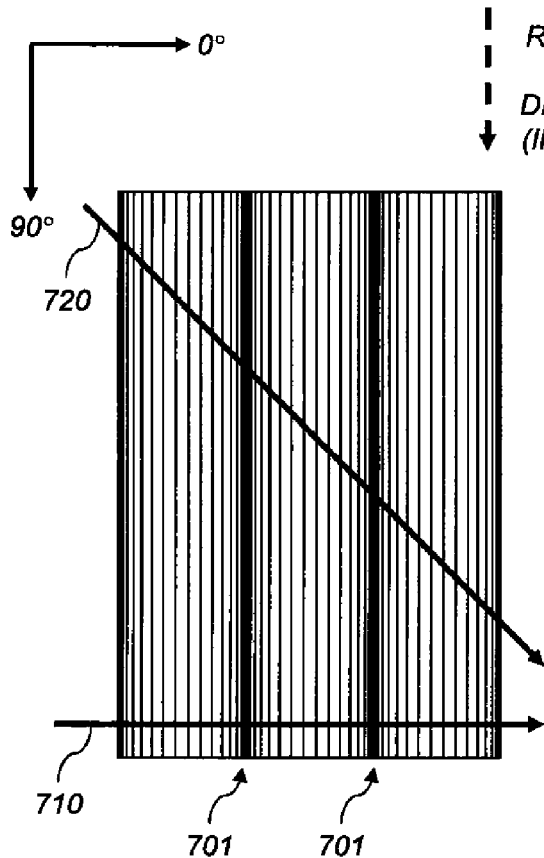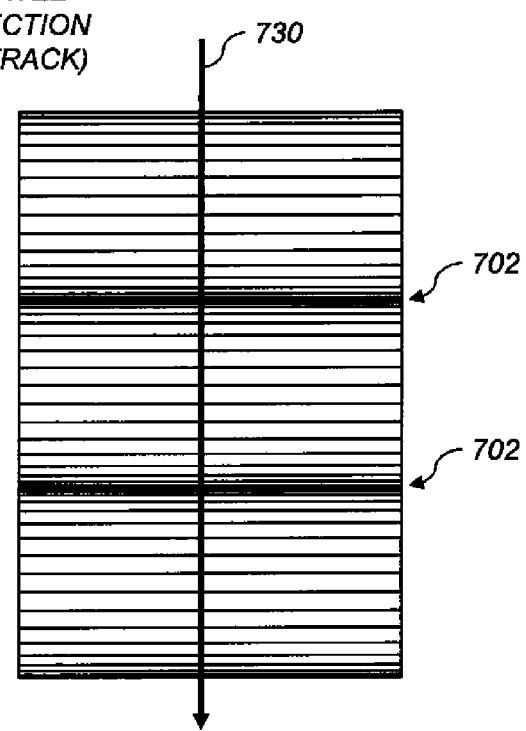
FIG. 7A  FIG. 7B

PRODUCING CORRECTION DATA FOR PRINTER

CROSS-REFERENCE TO RELATED APPLICATIONS

This application has related subject matter to U.S. patent application Ser. No. 13/076,467, filed Mar. 31, 2011, titled "COMPENSATING FOR PERIODIC NONUNIFORMITY IN ELECTROPHOTOGRAPHIC PRINTER," by Thomas A. Henderson et al., which is incorporated herein by reference.

FIELD OF THE INVENTION

This invention pertains to the field of printing and more particularly to compensating for nonuniformities in prints.

BACKGROUND OF THE INVENTION

Printers are useful for producing printed images of a wide range of types. Printers print on receivers (or "imaging substrates"), such as pieces or sheets of paper or other planar media, glass, fabric, metal, or other objects. Printers typically operate using subtractive color: a substantially reflective receiver is overcoated image-wise with cyan (C), magenta (M), yellow (Y), black (K), and other colorants. Various schemes can be used to process images to be printed. Printers can operate by inkjet, electrophotography, and other processes.

In the electrophotographic (EP) process, an electrostatic latent image is formed on a photoreceptor by uniformly charging the photoreceptor and then discharging selected areas of the uniform charge to yield an electrostatic charge pattern corresponding to the desired image (a "latent image"). After the latent image is formed, charged toner particles are brought into the vicinity of the photoreceptor and are attracted to the latent image to develop the latent image into a visible image. Note that the visible image may not be visible to the naked eye depending on the composition of the toner particles (e.g., clear toner).

After the latent image is developed into a visible image on the photoreceptor, a suitable receiver is brought into juxtaposition with the visible image. A suitable electric field is applied to transfer the toner particles of the visible image to the receiver to form the desired print image on the receiver. The receiver is then removed from its operative association with the photoreceptor and subjected to heat or pressure to permanently fix ("fuse") the print image to the receiver. Plural print images, e.g., of separations of different colors, are overlaid on one receiver before fusing to form a multi-color print image on the receiver.

Printers typically transport the receiver past an imaging element (e.g., the photoreceptor) to form the print image. The direction of travel of the receiver is referred to as the slow-scan, process, or in-track direction. This is typically the vertical (Y) direction of a portrait-oriented receiver. The direction perpendicular to the slow-scan direction is referred to as the fast-scan, cross-process, or cross-track direction, and is typically the horizontal (X) direction of a portrait-oriented receiver. "Scan" does not imply that any components are moving or scanning across the receiver; the terminology is conventional in the art.

Various components used in printing processes, such as belts and drums, can have mechanical or electrical characteristics that result in periodic objectionable non-uniformities in print images, such as streaks (extending in-track) or bands (extending cross-track). For example, drums can experience runout: they can be elliptical rather than circular in cross-section, or can be mounted slightly off-center, so that the radius of the drum at a particular angle with the horizontal varies over time. Belts can have thicknesses that vary across their widths (cross-track) or along their lengths (in-track). Damped springs for mounting components can experience periodic vibrations, causing the spacing between the mounted components to change over time. These variations can be periodic in nature, that is, each variation cycles through various magnitudes repeatedly in sequence, at a characteristic and generally fixed frequency. The variations can also be non-periodic. For example, two cooperating drums with periodic non-uniformities at frequencies whose ratio is irrational will produce a non-periodic nonuniformity between them.

Various schemes have been proposed for correcting image artifacts in prints, including those resulting from these mechanical or electrical variations.

U.S. Pat. No. 7,058,325 to Hamby et al. deposits a test patch, measures its density, and corrects using a feedback or feedforward control routine. U.S. Pat. No. 5,546,165 to Rushing et al. scans a document to be reproduced, and the resulting reproduction, and adjusts for calibration errors in the processing of the image of the document. U.S. Pat. No. 6,885,833 to Stelter et al. detects variations and periodicities of densities in a print. U.S. Pat. No. 7,755,799 to Paul et al. also measures test patches, and uses a defect once-around signal to synchronize the measurements to the rotation of the drum. The once-around signal is derived from an optical sensor monitoring the drum's position. Paul describes that the phase of a periodic banding defect (an artifact extending cross-track) is difficult to measure because, unlike frequency, it varies from page to page. U.S. Pat. No. 7,382,507 to Wu analyzes test patterns to generate image quality defect records and stores the records in a database for later analysis.

However, multiple components in a printer can have individual non-uniformities that interact with each other. This results in significant cross-correlation and noise in measured density data, which makes compensation more difficult. Variations in the rotational frequency of components can also make it more difficult to extract each component's data from the measured data. There is an ongoing need, therefore, for an improved way of compensating for nonuniformities, including periodic nonuniformities, in a printer.

SUMMARY OF THE INVENTION

According to an aspect of the present invention, there is provided a method of producing correction data for a printer, comprising:

arranging a plurality of rotatable imaging members along a receiver feed path in the printer;

arranging one or more period sensors in operative arrangement with respective rotatable imaging members;

printing a test image using the imaging members and simultaneously using the period sensors to record the respective periods of the corresponding imaging members, the test image defining an aim density pattern;

measuring the printed test image along a selected measurement direction, determining a reproduced density pattern from the measurements, and determining a reproduction error signal using the aim density pattern and the reproduced density pattern;

a member-variation-determining step of, for each period sensor, determining a respective autocorrelation of the reproduction error signal for the corresponding period and, if the determined autocorrelation exceeds a selected threshold, decomposing the reproduction error signal at the corresponding period to determine a respective member-variation signal and removing the determined respective member-variation signal from the reproduction error signal to produce an adjusted reproduction error signal and a respective adjusted member variation signal;

a remaining-variation-determining step of, after the member-variation-determining step, separating the adjusted reproduction error signal into one or more remaining-variation signals, each having a respective significance;

a modifying step of, if the significance of any of the remaining-variation signals exceeds a selected threshold, modifying the adjusted reproduction error signal by removing that remaining-variation signal from the adjusted reproduction error signal and producing a respective adjusted remaining-variation signal;

repeating the remaining-variation-determining and modifying steps until no remaining-variation signal has significance exceeding the selected threshold; and a correction step of automatically producing a correction signal using the adjusted member-variation signals and the adjusted remaining-variation signals using a processor.

An advantage of this invention is that it compensates for periodic nonuniformities with known sources and for nonuniformities without known sources. The period sensors provide effective compensation for nonuniformities introduced by specific members. The separated remaining-variation signals provide compensation for other sources of nonuniformity, even if their physical origins are not known. This also permits correcting for periodic variations that arise from the interactions of two or more members (e.g., beat-frequency terms) without requiring a detailed physical model of the members' rotations or the interaction. Various embodiments permit tuning the compensation to more effectively compensate for variations on a specific printer or model of printers. Various embodiments provide diagnostic information useful in determining the causes of errors in a print.

BRIEF DESCRIPTION OF THE DRAWINGS

The above and other objects, features, and advantages of the present invention will become more apparent when taken in conjunction with the following description and drawings wherein identical reference numerals have been used, where possible, to designate identical features that are common to the figures, and wherein:

FIG. 4 shows various embodiments of methods of producing correction data for a printer;

FIG. 7A shows an example of a printed receiver with streaking nonuniformity;

FIG. 7B shows an example of a printed receiver with banding nonuniformity;

Figure 1:
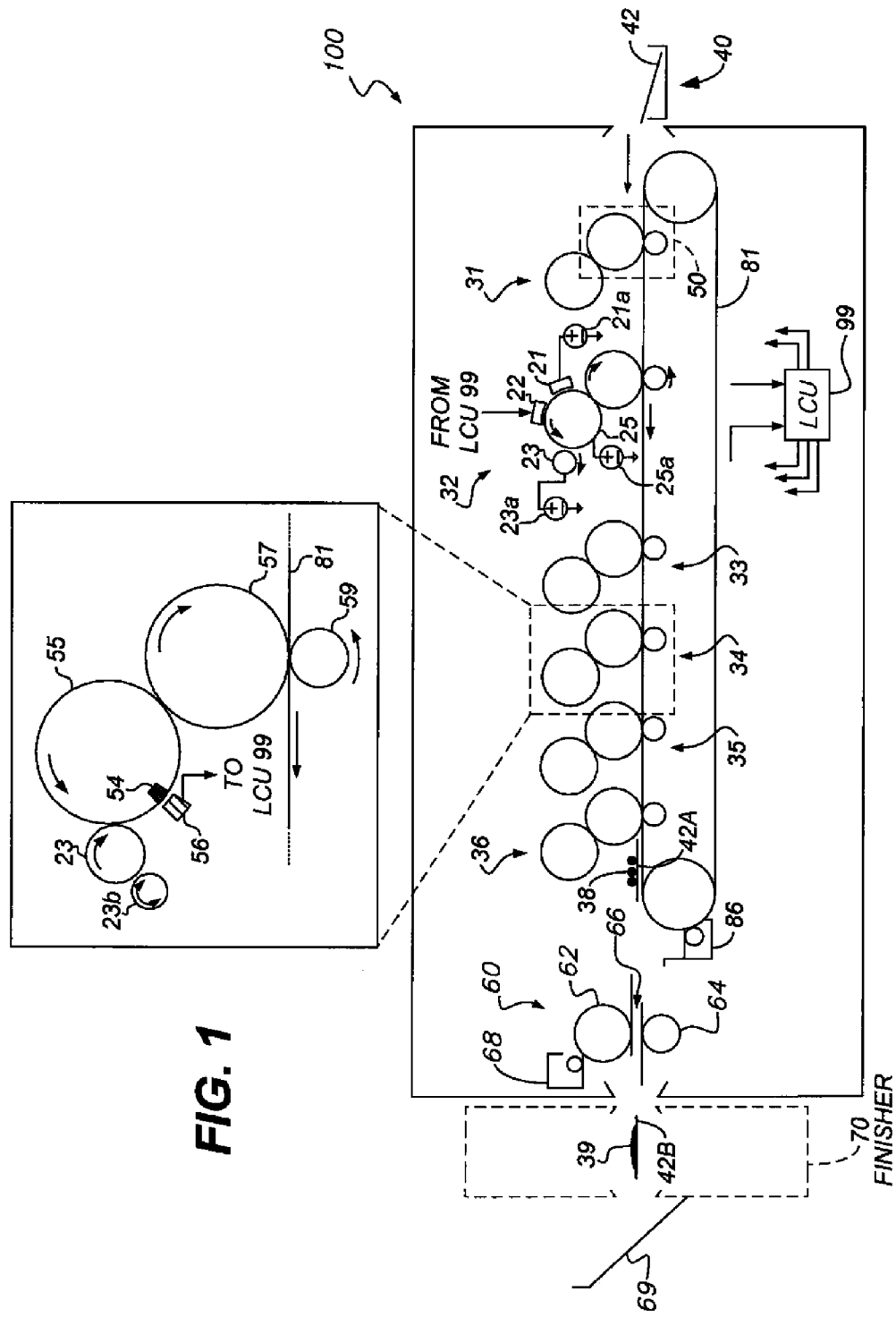
FIG. 1 is an elevational cross-section of an electrophotographic reproduction apparatus.

The attached drawings are for purposes of illustration and are not necessarily to scale.

DETAILED DESCRIPTION OF THE INVENTION

In the following description, some embodiments will be described in terms that would ordinarily be implemented as software programs. Those skilled in the art will readily recognize that the equivalent of such software can also be constructed in hardware. Because data-manipulation algorithms and systems are well known, the present description will be directed in particular to algorithms and systems forming part of, or cooperating more directly with, methods described herein. Other aspects of such algorithms and systems, and hardware or software for producing and otherwise processing the compensation data and image signals involved therewith, not specifically shown or described herein, are selected from such systems, algorithms, components, and elements known in the art. Given the system as described herein, software not specifically shown, suggested, or described herein that is useful for implementation of various embodiments is conventional and within the ordinary skill in such arts.

A computer program product can include one or more storage media, for example: magnetic storage media such as magnetic disk (such as a floppy disk) or magnetic tape; optical storage media such as optical disk, optical tape, or machine readable bar code; solid-state electronic storage devices such as random access memory (RAM), or read-only memory (ROM); or any other physical device or media employed to store a computer program having instructions for controlling one or more computers to practice methods according to various embodiments.

The electrophotographic (EP) printing process can be embodied in devices including printers, copiers, scanners, and facsimiles, and analog or digital devices, all of which are referred to herein as "printers." Electrostatographic printers such as electrophotographic printers that employ toner developed on an electrophotographic receiver can be used, as can ionographic printers and copiers that do not rely upon an electrophotographic receiver. Electrophotography and ionography are types of electrostatography (printing using electrostatic fields), which is a subset of electrography (printing using electric fields).

A digital reproduction printing system ("printer") typically includes a digital front-end processor (DFE), a print engine (also referred to in the art as a "marking engine") for applying toner to the receiver, and one or more post-printing finishing system(s) (e.g. a UV coating system, a glosser system, or a laminator system). A printer can reproduce pleasing black-and-white or color onto a receiver. A printer can also produce selected patterns of toner on a receiver, which patterns (e.g. surface textures) do not correspond directly to a visible image. The DFE receives input electronic files (such as Postscript command files) composed of images from other input devices (e.g., a scanner, a digital camera). The DFE can include various function processors, e.g. a raster image processor (RIP), image positioning processor, image manipulation processor, color processor, or image storage processor. The DFE rasterizes input electronic files into image bitmaps for the print engine to print. In some embodiments, the DFE permits a human operator to set up parameters such as layout, font, color, media type, or post-finishing options. The print engine takes the rasterized image bitmap from the DFE and renders the bitmap into a form that can control the printing process from the exposure device to transferring the print image onto the receiver. The finishing system applies features such as protection, glossing, or binding to the prints. The finishing system can be implemented as an integral component of a printer, or as a separate machine through which prints are fed after they are printed.

The printer can also include a color management system which captures the characteristics of the image printing process implemented in the print engine (e.g. the electrophotographic process) to provide known, consistent color reproduction characteristics. The color management system can also provide known color reproduction for different inputs (e.g. digital camera images or film images).

In an embodiment of an electrophotographic modular printing machine, e.g. the NEXPRESS 3000SE printer manufactured by Eastman Kodak Company of Rochester, N.Y., color-toner print images are made in a plurality of color imaging modules arranged in tandem, and the print images are successively electrostatically transferred to a receiver adhered to a transport web moving through the modules. Colored toners include colorants, e.g. dyes or pigments, which absorb specific wavelengths of visible light. Commercial machines of this type typically employ intermediate transfer members in the respective modules for transferring visible images from the photoreceptor and transferring print images to the receiver. In other electrophotographic printers, each visible image is directly transferred to a receiver to form the corresponding print image.

Electrophotographic printers having the capability to also deposit clear toner using an additional imaging module are also known. As used herein, clear toner is considered to be a color of toner, as are C, M, Y, K, and Lk, but the term "colored toner" excludes clear toners. The provision of a clear-toner overcoat to a color print is desirable for providing protection of the print from fingerprints and reducing certain visual artifacts. Clear toner uses particles that are similar to the toner particles of the color development stations but without colored material (e.g. dye or pigment) incorporated into the toner particles. However, a clear-toner overcoat can add cost and reduce color gamut of the print; thus, it is desirable to provide for operator/user selection to determine whether or not a clear-toner overcoat will be applied to the entire print. A uniform layer of clear toner can be provided. A layer that varies inversely according to heights of the toner stacks can also be used to establish level toner stack heights. The respective toners are deposited one upon the other at respective locations on the receiver and the height of a respective toner stack is the sum of the toner heights of each respective color. Uniform stack height provides the print with a more even or uniform gloss.

FIG. 1 is an elevational cross-section showing portions of a typical electrophotographic printer 100. Printer 100 is adapted to produce print images, such as single-color (monochrome), CMYK, or hexachrome (six-color) images, on a receiver (multicolor images are also known as "multi-component" images). Images can include text, graphics, photos, and other types of visual content. An embodiment involves printing using an electrophotographic print engine having six sets of single-color image-producing or -printing stations or modules arranged in tandem, but more or fewer than six colors can be combined to form a print image on a given receiver. Other electrophotographic writers or printer apparatus can also be included. Various components of printer 100 are shown as rollers; other configurations are also possible, including belts.

Referring to FIG. 1, printer 100 is an electrophotographic printing apparatus having a number of tandemly-arranged electrophotographic image-forming printing modules 31, 32, 33, 34, 35, 36, also known as electrophotographic imaging subsystems. Each printing module 31, 32, 33, 34, 35, 36 produces a single-color toner image for transfer using a respective transfer subsystem 50 (for clarity, only one is labeled) to a receiver 42 successively moved through the modules. Receiver 42 is transported from supply unit 40, which can include active feeding subsystems as known in the art, into printer 100. In various embodiments, the visible image can be transferred directly from an imaging roller to a receiver 42, or from an imaging roller to one or more transfer roller(s) or belt(s) in sequence in transfer subsystem 50, and thence to receiver 42. Receiver 42 is, for example, a selected section of a web of, or a cut sheet of, planar media such as paper or transparency film.

Each printing module 31, 32, 33, 34, 35, 36 includes various components. For clarity, these are only shown in printing module 32. Around photoreceptor 25 are arranged, ordered by the direction of rotation of photoreceptor 25, charger 21, exposure subsystem 22, and toning station 23.

In the EP process, an electrostatic latent image is formed on photoreceptor 25 by uniformly charging photoreceptor 25 and then discharging selected areas of the uniform charge to yield an electrostatic charge pattern corresponding to the desired image (a "latent image"). Charger 21 produces a uniform electrostatic charge on photoreceptor 25 or its surface. Exposure subsystem 22 selectively image-wise discharges photoreceptor 25 to produce a latent image. Exposure subsystem 22 can include a laser and raster optical scanner (ROS), one or more LEDs, or a linear LED array.

After the latent image is formed, charged toner particles are brought into the vicinity of photoreceptor 25 by toning station 23 and are attracted to the latent image to develop the latent image into a visible image. Note that the visible image may not be visible to the naked eye depending on the composition of the toner particles (e.g. clear toner). Toning station 23 can also be referred to as a development station. Toner can be applied to either the charged or discharged parts of the latent image.

After the latent image is developed into a visible image on photoreceptor 25, a suitable receiver 42 is brought into juxtaposition with the visible image. In transfer subsystem 50, a suitable electric field is applied to transfer the toner particles of the visible image to receiver 42 to form the desired print image 38 on the receiver, as shown on receiver 42A. The imaging process is typically repeated many times with reusable photoreceptors 25.

Receiver 42A is then removed from its operative association with photoreceptor 25 and subjected to heat or pressure to permanently fix ("fuse") print image 38 to receiver 42A. Plural print images, e.g. of separations of different colors, are overlaid on one receiver before fusing to form a multi-color print image 38 on receiver 42A.

The inset for printing module 34 shows additional details that can also be present in all six printing modules 31, 32, 33, 34, 35, 36. For clarity, these components are only shown with respect to printing module 34. Photoreceptor 55 (corresponding to photoreceptor 25 in printing module 32) has developed thereon a visible image containing toner. Photoreceptor 55 is in contact with intermediate transfer member 57, which can be a belt or drum and can have a compliant surface. The visible image is transferred from photoreceptor 25 to intermediate transfer member 57 as the two rotate. The visible image is then transferred to receiver 42 travelling on transport web 81 by pressure between intermediate transfer member 57 and transfer backup member 59 (e.g., a roller), and by an electric field applied between members 57, 59.

The feed path of receiver 42, in this example, is the path from supply unit 40 along transport web 81, through fuser 60 and finisher 70, and to output tray 69. Along the feed path, there is a plurality of rotatable imaging members, such as those discussed above. Transport web 81 is also an imaging member. "Imaging members" are those members for which variations in rotational speed or other properties affect the image quality of a print.

One or more period sensors are arranged in operative arrangement with respective rotatable imaging members in the printer. "Period sensors" can be sensors that detect period directly, or detect frequency and convert it to period. Period sensors can optionally also detect phase. Each period sensor is arranged so that it can detect the period of rotation of the corresponding rotatable imaging member. In this example, photoreceptor 55 is a drum, and an optical or magnetic flag 54 is affixed to one end of photoreceptor 55 and rotates with it. Period sensor 56 is fixed and detects flag 54 when flag 54 rotates past sensor 56. Period sensor 56 reports the times between successive passes of flag 54 to logic and control unit (LCU) 99. Period sensors can operate optically (e.g., an opto-interruptor), magnetically (e.g., a magnet moving past a coil to produce current, such as in a magneto), electrically (e.g., flag 54 can have a different capacitance than the surrounding area, so when flag 54 passes sensor 56, an electric field between the two detectably changes in magnitude), mechanically (e.g., a pawl that trips a microswitch), or by combinations or other mechanisms (e.g., an optical encoder).

Each receiver 42, during a single pass through the six printing modules 31, 32, 33, 34, 35, 36, can have transferred in registration thereto up to six single-color toner images to form a pentachrome image. As used herein, the term "hexachrome" implies that in a print image, combinations of various of the six colors are combined to form other colors on receiver 42 at various locations on receiver 42. That is, each of the six colors of toner can be combined with toner of one or more of the other colors at a particular location on receiver 42 to form a color different than the colors of the toners combined at that location. In an embodiment, printing module 31 forms black (K) print images, 32 forms yellow (Y) print images, 33 forms magenta (M) print images, 34 forms cyan (C) print images, 35 forms light-black (Lk) images, and 36 forms clear images.

In various embodiments, printing module 36 forms print image 38 using a clear toner or tinted toner. Tinted toners absorb less light than they transmit, but do contain pigments or dyes that move the hue of light passing through them towards the hue of the tint. For example, a blue-tinted toner coated on white paper will cause the white paper to appear light blue when viewed under white light, and will cause yellows printed under the blue-tinted toner to appear slightly greenish under white light.

Receiver 42A is shown after passing through printing module 36. Print image 38 on receiver 42A includes unfused toner particles.

Subsequent to transfer of the respective print images 38, overlaid in registration, one from each of the respective printing modules 31, 32, 33, 34, 35, 36, receiver 42A is advanced to a fuser 60, i.e. a fusing or fixing assembly, to fuse print image 38 to receiver 42A. Transport web 81 transports the print-image-carrying receivers (e.g., 42A) to fuser 60, which fixes the toner particles to the respective receivers 42A by the application of heat and pressure. The receivers 42A are serially de-tacked from transport web 81 to permit them to feed cleanly into fuser 60. Transport web 81 is then reconditioned for reuse at cleaning station 86 by cleaning and neutralizing the charges on the opposed surfaces of the transport web 81. A mechanical cleaning station (not shown) for scraping or vacuuming toner off transport web 81 can also be used independently or with cleaning station 86. The mechanical cleaning station can be disposed along transport web 81 before or after cleaning station 86 in the direction of rotation of transport web 81.

Fuser 60 includes a heated fusing roller 62 and an opposing pressure roller 64 that form a fusing nip 66 therebetween. In an embodiment, fuser 60 also includes a release fluid application substation 68 that applies release fluid, e.g. silicone oil, to fusing roller 62. Alternatively, wax-containing toner can be used without applying release fluid to fusing roller 62. Other embodiments of fusers, both contact and non-contact, can be employed. For example, solvent fixing uses solvents to soften the toner particles so they bond with the receiver 42. Photoflash fusing uses short bursts of high-frequency electromagnetic radiation (e.g. ultraviolet light) to melt the toner. Radiant fixing uses lower-frequency electromagnetic radiation (e.g. infrared light) to more slowly melt the toner. Microwave fixing uses electromagnetic radiation in the microwave range to heat the receivers (primarily), thereby causing the toner particles to melt by heat conduction, so that the toner is fixed to the receiver 42.

The receivers (e.g., receiver 42B) carrying the fused image (e.g., fused image 39) are transported in a series from the fuser 60 along a path either to a remote output tray 69, or back to printing modules 31, 32, 33, 34, 35, 36 to create an image on the backside of the receiver (e.g., receiver 42B), i.e. to form a duplex print. Receivers (e.g., receiver 42B) can also be transported to any suitable output accessory. For example, an auxiliary fuser or glossing assembly can provide a clear-toner overcoat. Printer 100 can also include multiple fusers 60 to support applications such as overprinting, as known in the art.

In various embodiments, between fuser 60 and output tray 69, receiver 42B passes through finisher 70. Finisher 70 performs various media-handling operations, such as folding, stapling, saddle-stitching, collating, and binding.

Printer 100 includes main printer apparatus logic and control unit (LCU) 99, which receives input signals from the various sensors associated with printer 100 and sends control signals to the components of printer 100. LCU 99 can include a microprocessor incorporating suitable look-up tables and control software executable by the LCU 99. It can also include a field-programmable gate array (FPGA), programmable logic device (PLD), microcontroller, or other digital control system. LCU 99 can include memory for storing control software and data. Sensors associated with the fusing assembly provide appropriate signals to the LCU 99. In response to the sensors, the LCU 99 issues command and control signals that adjust the heat or pressure within fusing nip 66 and other operating parameters of fuser 60 for receivers. This permits printer 100 to print on receivers of various thicknesses and surface finishes, such as glossy or matte.

Image data for writing by printer 100 can be processed by a raster image processor (RIP; not shown), which can include a color separation screen generator or generators. The output of the RIP can be stored in frame or line buffers for transmission of the color separation print data to each of respective LED writers, e.g. for black (K), yellow (Y), magenta (M), cyan (C), and red (R), respectively. The RIP or color separation screen generator can be a part of printer 100 or remote therefrom. Image data processed by the RIP can be obtained from a color document scanner or a digital camera or produced by a computer or from a memory or network which typically includes image data representing a continuous image that needs to be reprocessed into halftone image data in order to be adequately represented by the printer. The RIP can perform image processing processes, e.g. color correction, in order to obtain the desired color print. Color image data is separated into the respective colors and converted by the RIP to halftone dot image data in the respective color using matrices, which comprise desired screen angles (measured counterclockwise from rightward, the +X direction) and screen rulings. The RIP can be a suitably-programmed computer or logic device and is adapted to employ stored or computed matrices and templates for processing separated color image data into rendered image data in the form of halftone information suitable for printing. These matrices can include a screen pattern memory (SPM).

Various parameters of the components of a printing module (e.g., printing module 31) can be selected to control the operation of printer 100. In an embodiment, charger 21 is a corona charger including a grid between the corona wires (not shown) and photoreceptor 25. Voltage source 21a applies a voltage to the grid to control charging of photoreceptor 25. In an embodiment, a voltage bias is applied to toning station 23 by voltage source 23a to control the electric field, and thus the rate of toner transfer, from toning station 23 to photoreceptor 25. In an embodiment, a voltage is applied to a conductive base layer of photoreceptor 25 by voltage source 25a before development, that is, before toner is applied to photoreceptor 25 by toning station 23. The applied voltage can be zero; the base layer can be grounded. This also provides control over the rate of toner deposition during development. In an embodiment, the exposure applied by exposure subsystem 22 to photoreceptor 25 is controlled by LCU 99 to produce a latent image corresponding to the desired print image. All of these parameters can be changed, as described below.

Further details regarding printer 100 are provided in U.S. Pat. No. 6,608,641, issued on Aug. 19, 2003, to Peter S. Alexandrovich et al., and in U.S. Publication No. 2006/0133870, published on Jun. 22, 2006, by Yee S. Ng et al., the disclosures of which are incorporated herein by reference.

Figure 2:
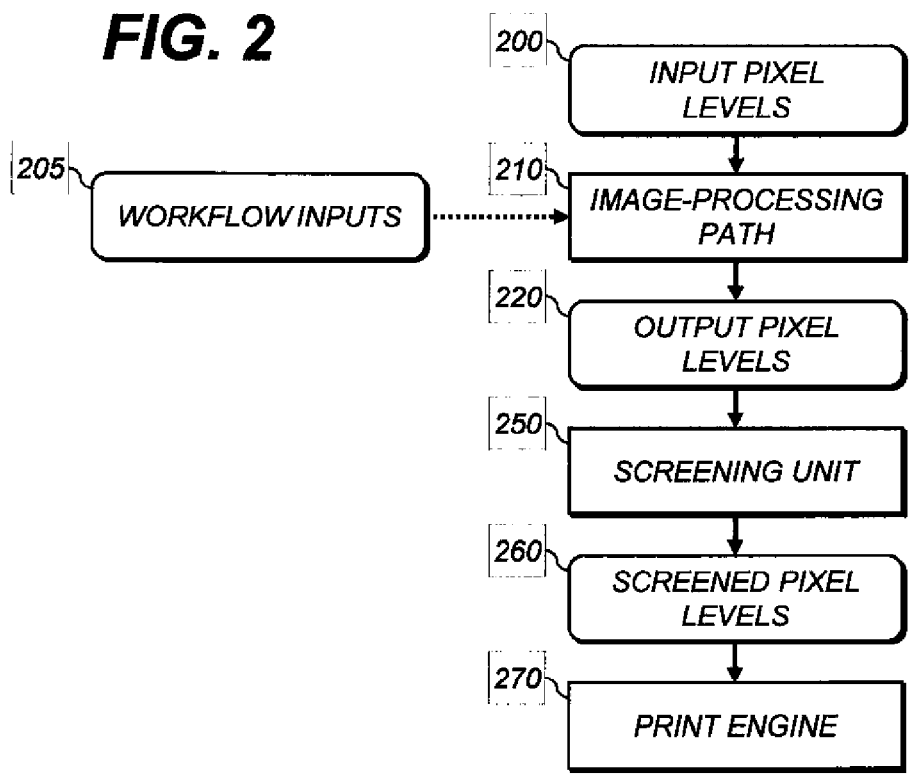
FIG. 2 is a schematic of a data-processing path.

FIG. 2 shows a data-processing path, and defines several terms used herein. Printer 100 (FIG. 1) or corresponding electronics (e.g. the DFE or RIP), described herein, operate this datapath to produce image data corresponding to exposure to be applied to a photoreceptor, as described above. The datapath can be partitioned in various ways between the DFE and the print engine, as is known in the image-processing art.

The following discussion relates to a single pixel; in operation, data processing takes place for a plurality of pixels that together compose an image. The term "resolution" herein refers to spatial resolution, e.g. in cycles per degree. The term "bit depth" refers to the range and precision of values. Each set of pixel levels has a corresponding set of pixel locations. Each pixel location is the set of coordinates on the surface of receiver 42 (FIG. 1) at which an amount of toner corresponding to the respective pixel level should be applied.

Printer 100 receives input pixel levels 200. These can be any level known in the art, e.g. sRGB code values (0 . . . 255) for red, green, and blue (R, G, B) color channels. There is one pixel level for each color channel. Input pixel levels 200 can be in an additive or subtractive space. Image-processing path 210 converts input pixel levels 200 to output pixel levels 220, which can be cyan, magenta, yellow (CMY); cyan, magenta, yellow, black (CMYK); or values in another subtractive color space. This conversion can be part of the color-management system discussed above. Output pixel level 220 can be linear or non-linear with respect to exposure, L*, or other factors known in the art.

Image-processing path 210 transforms input pixel levels 200 of input color channels (e.g. R) in an input color space (e.g. sRGB) to output pixel levels 220 of output color channels (e.g. C) in an output color space (e.g. CMYK). In various embodiments, image-processing path 210 transforms input pixel levels 200 to desired CIELAB (CIE 1976 L*a*b*; CIE Pub. 15:2004, 3rd. ed., §8.2.1) values or ICC PCS (Profile Connection Space) LAB values, and thence optionally to values representing the desired color in a wide-gamut encoding such as ROMM RGB. The CIELAB, PCS LAB or ROMM RGB values are then transformed to device-dependent CMYK values to maintain the desired colorimetry of the pixels. Image-processing path 210 can use optional workflow inputs 205, e.g. ICC profiles of the image and the printer 100, to calculate the output pixel levels 220. RGB can be converted to CMYK according to the Specifications for Web Offset Publications (SWOP; ANSI CGATS TR001 and CGATS.6), Euroscale (ISO 2846-1:2006 and ISO 12647), or other CMYK standards.

Input pixels are associated with an input resolution in pixels per inch (ippi, input pixels per inch), and output pixels with an output resolution (oppi). Image-processing path 210 scales or crops the image, e.g. using bicubic interpolation, to change resolutions when ippi≠oppi. The following steps in the path (output pixel levels 220, screened pixel levels 260) are preferably also performed at oppi, but each can be a different resolution, with suitable scaling or cropping operations between them.

Screening unit 250 calculates screened pixel levels 260 from output pixel levels 220. Screening unit 250 can perform continuous-tone (processing), halftone, multitone, or multilevel halftone processing, and can include a screening memory or dither bitmaps. Screened pixel levels 260 are at the bit depth required by print engine 270.

Print engine 270 represents the subsystems in printer 100 that apply an amount of toner corresponding to the screened pixel levels to a receiver 42 (FIG. 1) at the respective screened pixel locations. Examples of these subsystems are described above with reference to FIG. 1. The screened pixel levels and locations can be the engine pixel levels and locations, or additional processing can be performed to transform the screened pixel levels and locations into the engine pixel levels and locations.

Figure 3:
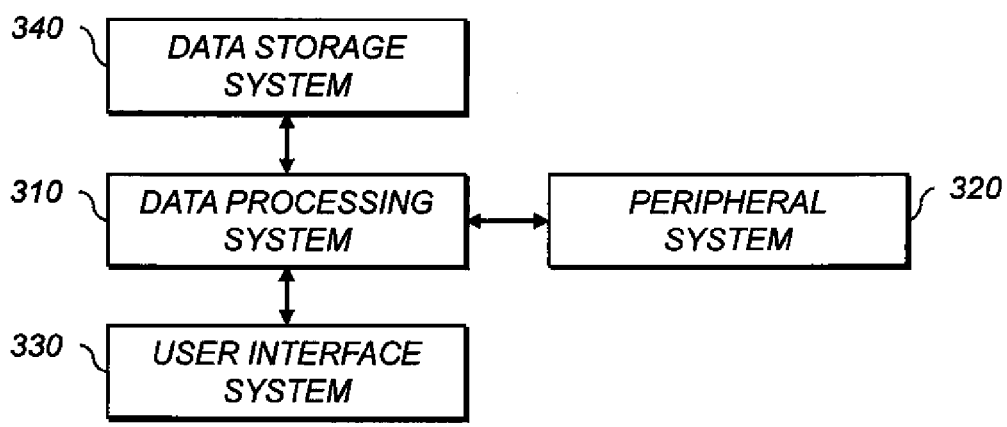
FIG. 3 is a high-level diagram showing components of a processing system useful with various embodiments.

FIG. 3 is a high-level diagram showing components of a processing system useful with various embodiments. The system includes a data processing system 310, a peripheral system 320, a user interface system 330, and a data storage system 340. Peripheral system 320, user interface system 330 and data storage system 340 are communicatively connected to data processing system 310.

Data processing system 310 includes one or more data processing devices that implement the processes of various embodiments, including the example processes described herein. The phrases "data processing device" or "data processor" are intended to include any data processing device, such as a central processing unit ("CPU"), a desktop computer, a laptop computer, a mainframe computer, a personal digital assistant, a Blackberry™, a digital camera, cellular phone, or any other device for processing data, managing data, or handling data, whether implemented with electrical, magnetic, optical, biological components, or otherwise.

Data storage system 340 includes one or more processor-accessible memories configured to store information, including the information needed to execute the processes of the various embodiments, including the example processes described herein. Data storage system 340 can be a distributed processor-accessible memory system including multiple processor-accessible memories communicatively connected to data processing system 310 via a plurality of computers or devices. On the other hand, data storage system 340 need not be a distributed processor-accessible memory system and, consequently, can include one or more processor-accessible memories located within a single data processor or device.

The phrase "processor-accessible memory" is intended to include any processor-accessible data storage device, whether volatile or nonvolatile, electronic, magnetic, optical, or otherwise, including but not limited to, registers, floppy disks, hard disks, Compact Discs, DVDs, flash memories, ROMs, and RAMs.

The phrase "communicatively connected" is intended to include any type of connection, whether wired or wireless, between devices, data processors, or programs in which data can be communicated. The phrase "communicatively connected" is intended to include a connection between devices or programs within a single data processor, a connection between devices or programs located in different data processors, and a connection between devices not located in data processors at all. In this regard, although the data storage system 340 is shown separately from data processing system 310, one skilled in the art will appreciate that data storage system 340 can be stored completely or partially within data processing system 310. Further in this regard, although peripheral system 320 and user interface system 330 are shown separately from data processing system 310, one skilled in the art will appreciate that one or both of such systems can be stored completely or partially within data processing system 310.

Peripheral system 320 can include one or more devices configured to provide digital content records to data processing system 310. For example, peripheral system 320 can include digital still cameras, digital video cameras, cellular phones, or other data processors. Data processing system 310, upon receipt of digital content records from a device in peripheral system 320, can store such digital content records in data storage system 340. Peripheral system 320 can also include a printer interface for causing a printer to produce output corresponding to digital content records stored in data storage system 340 or produced by data processing system 310.

User interface system 330 can include a mouse, a keyboard, another computer, or any device or combination of devices from which data is input to data processing system 310. In this regard, although peripheral system 320 is shown separately from user interface system 330, peripheral system 320 can be included as part of user interface system 330.

User interface system 330 also can include a display device, a processor-accessible memory, or any device or combination of devices to which data is output by data processing system 310. In this regard, if user interface system 330 includes a processor-accessible memory, such memory can be part of data storage system 340 even though user interface system 330 and data storage system 340 are shown separately in FIG. 3.

FIG. 4 shows various embodiments of methods of producing correction data for a printer. Processing begins with step 410.

In step 410, a plurality of rotatable imaging members are arranged along a receiver feed path in the printer. Rotatable imaging members can include belts, drums, or other members that undergo periodic motion and that have an effect on the printed image. Examples include photoreceptors, transport belts, and other components shown in FIG. 1. Rotatable imaging members do not have to participate directly in moving colorant if they have an effect on the printed image. For example, in an electrophotographic (EP) printer, a toning roller in toning station 23 (FIG. 1) is a rotatable imaging member even though no "image" is formed on it. The quality of toner transfer from toning station 23 to photoreceptor 25 (FIG. 1) can affect image quality. Step 410 is followed by step 415.

In step 415, one or more period sensors are arranged in operative arrangement with respective rotatable imaging members. Each period sensor detects the period of rotation of the corresponding rotatable imaging member. Period sensors can additionally detect phase. They can also detect frequency and convert it to phase; as used herein, frequency and period are considered interchangeable since either can be used. Period sensors are discussed above with respect to FIG. 1. Step 415 is followed by step 420.

Figure 10:
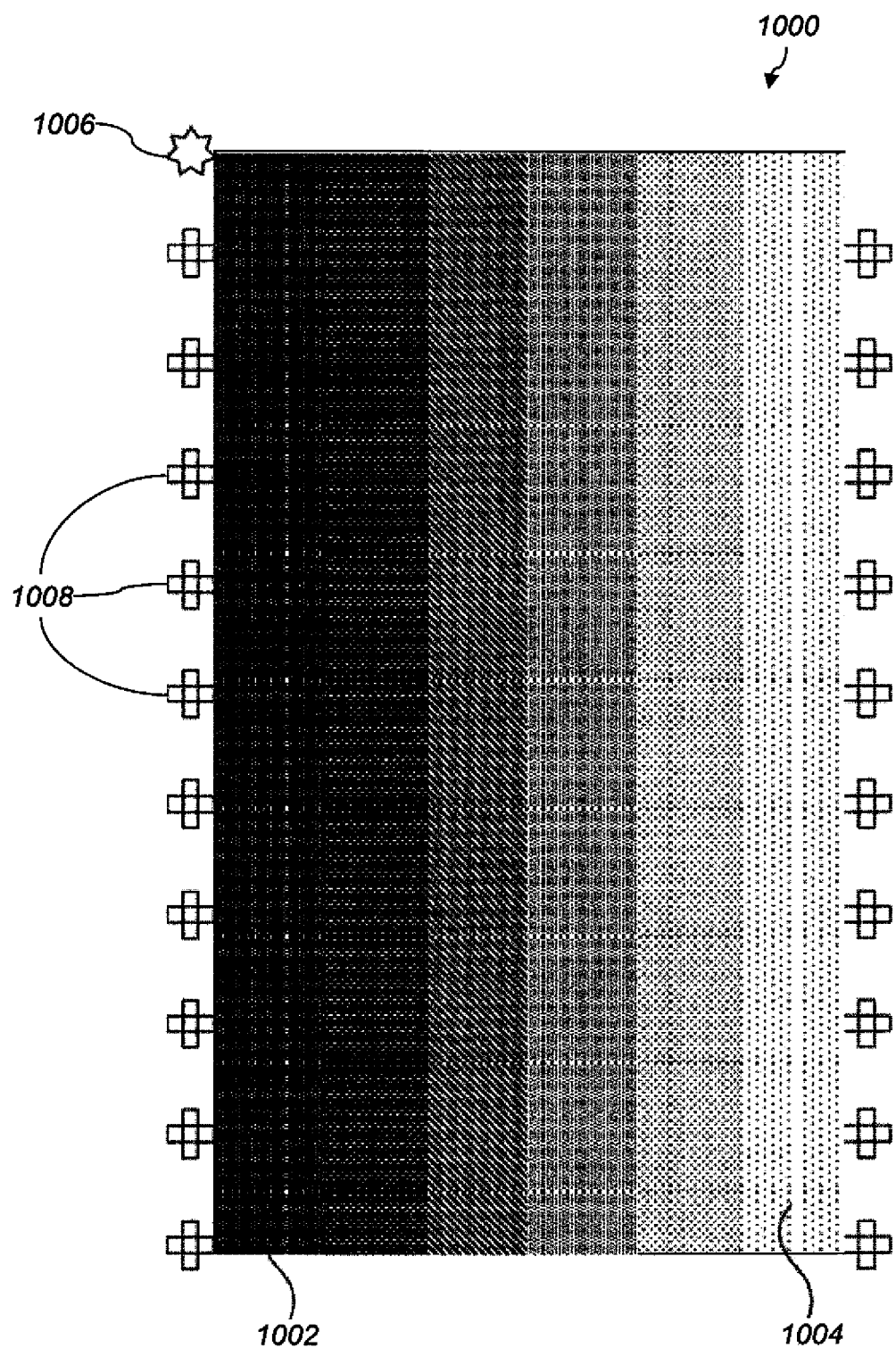
FIG. 10 is a graphic representation of a test target useful with various embodiments.

In step 420, a test image is printed using the rotatable imaging members, and optionally also other members. The test image is defined by an aim density pattern. An example of a test target (test image to be printed) is shown in FIG. 10. While the test target is being printed, the period sensors simultaneously record the respective periods of the corresponding imaging members. Step 420 is followed by step 425.

In step 425, the printed test image is measured along a selected measurement direction, i.e., along one or more traces substantially parallel to the direction. The measurement can be performed using an off-line scanner, e.g., a flatbed scanner, or an inline scanner attached to the printer. A reproduced density pattern is determined from the measurements, and reproduction error signal 427 is determined using the aim density pattern and the reproduced density pattern. The aim density pattern represents what output the printer should produce, the reproduced density pattern represents what the printer did produce, and reproduction error signal 427 is the difference between them. Reproduction error signal 427 can be scaled, weighted, or transformed (linearly or nonlinearly). Step 425 produces reproduction error signal 427, which is provided to step 430.

As used herein, an "error" is a deviation from desired print density of a selected area on a printed test target. It is thus the difference between the aim density pattern and the reproduced density pattern in a selected test area of the printed test image. A "variation" is the cause of an error, e.g., a defect in the printer. Errors can be most clearly visible in flat fields of various sizes, but flat-field test targets do not have to be used. Reproduction error signal 427 is a signal, electrical (analog or digital) or otherwise, representing the magnitude of errors produced by the printer while printing the printed test image.

Some variations occur in rotatable imaging members that are measured by period sensors. These variations are represented by "member-variation signals," one such per measured rotatable imaging member. The member-variation signals are decomposed from reproduction error signal 427. Other variations occur in rotatable imaging members that are not measured by period sensors, or are present in members other than rotatable imaging members (e.g., corona chargers). These variations are represented by "remaining-variation signals" separated from adjusted reproduction error signal 450. The term "variation signal" refers to one or more member-variation signal(s) or remaining-variation signal(s), or both, or either, as will be clear from the context in which this term is used. To produce prints that do not show errors, correction signals are applied. One correction signal can be produced for each variation signal.

Reproduction error signal 427 determined in step 425 is processed to determine errors due to rotatable imaging members that are measured by period sensors. Steps 430-445 are performed one or more times to process data from each period sensor desired to be processed. Additional period sensors can be present but not measured, or measured but not processed. Steps 430-443 are shown as being performed once for each period sensor to be processed (a "depth-first" approach). However, these steps can also be performed in parallel: step 435 can be performed for each period sensor, then step 440 can be performed for each period sensor, and then step 443 can be performed for each period sensor (a "breadth-first" approach). Combinations of the depth-first and breadth-first methods can also be used. For example, steps 430-440 can be performed for each period sensor, then step 443 can be performed for each period sensor. The following describes the depth-first approach shown in FIG. 4, without limitation.

Figure 5A:
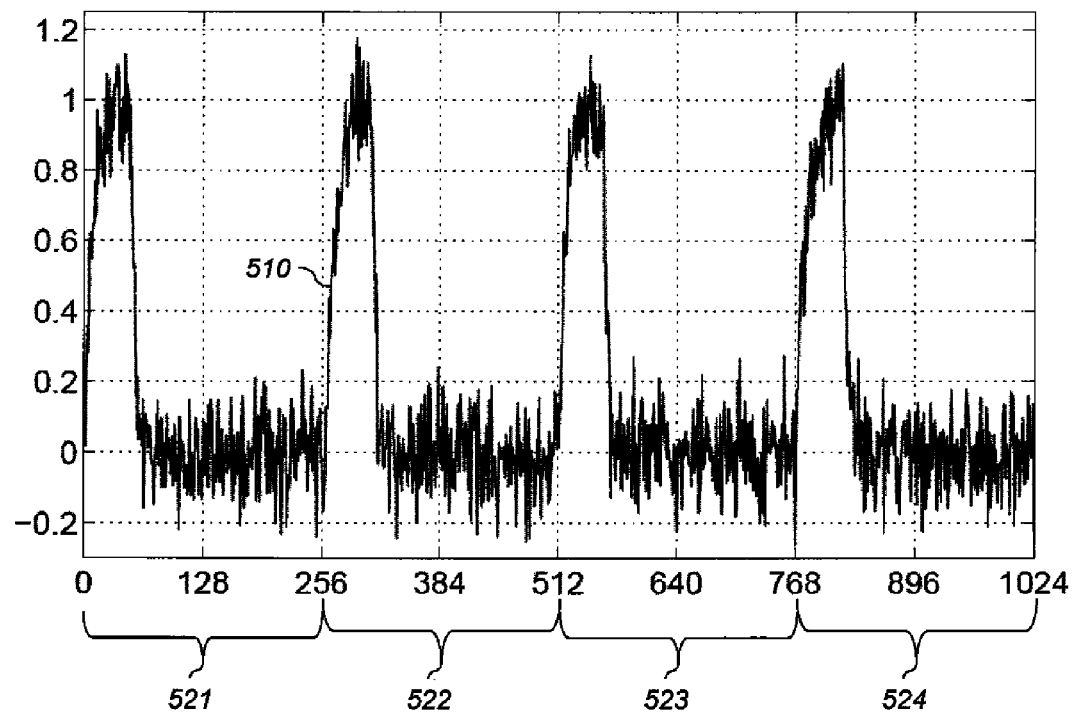
FIGS. 5A-5B show a simulated example of a reproduction error signal and its autocorrelation.
Figure 5B:
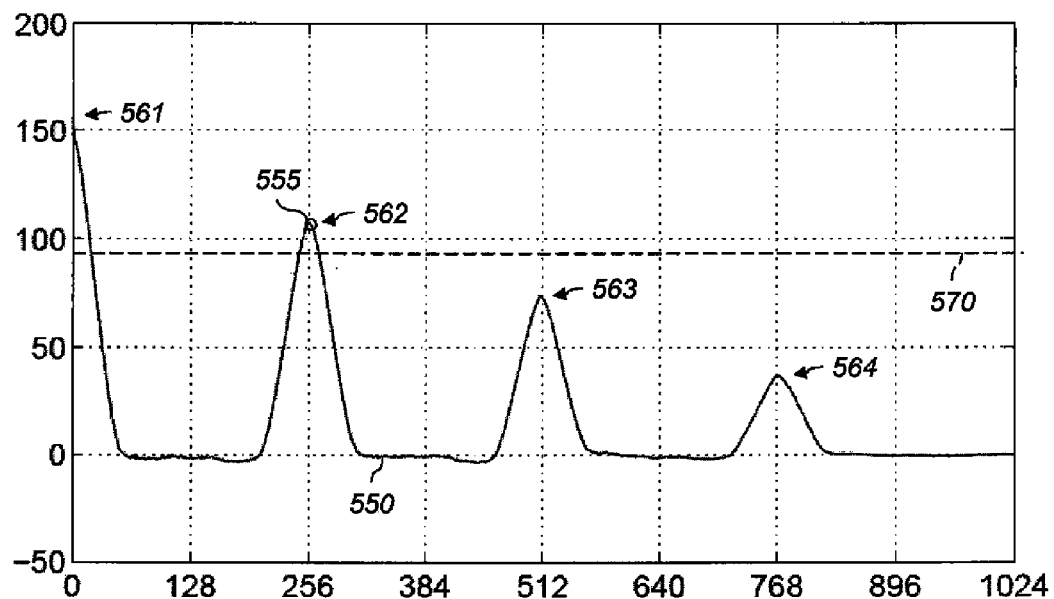

In this discussion, reference is also made to FIG. 5A, which shows an example of a reproduction error signal 510 with noise and jitter, and FIG. 5B, which shows the determined autocorrelation signal 550 of exemplary reproduction error signal 510. In FIG. 5A, the abscissa is sample number (arbitrary sampling rate) and the ordinate is amplitude (arbitrary units). In FIG. 5B, the abscissa is shift (number of samples) and the ordinate is the autocorrelation. Both are described below.

The example reproduction error signal 510 shown in FIG. 5A was produced in MATLAB; it is an exponential pulse train with noise. Specifically, a reference pulse r(n), n being the sample number on [1, 128], was produced:

$$r(n) = \begin{cases} 1 - \exp(-n/10), & n \in [1, 50] \\ \exp(-(n-50)/4), & n \in [51, 128] \end{cases} \quad \text{(Eq. 1)}$$

This pulse rises slowly ($\tau=10$) and falls off more quickly ($\tau=4$).

Copies of r(n) were then loaded into the first 128 samples of a 1024-sample vector, and the 128-sample blocks starting at sample numbers 260, 512, and 770. The blocks at sample numbers 1 and 512 were on time for a period of 256; the blocks at sample numbers 260 and 770 were delayed (from 256, 768 respectively) to simulate jitter. The amplitude of the resulting pulse train was approximately 1.0. To each sample, 0.1 times a random number was added, each random number selected from a Gaussian distribution having a mean of zero and a variance and standard deviation of 1.0. For the 1024 samples, 1024 random numbers were selected.

Referring to FIG. 4, in step 430, a period sensor is selected. A respective autocorrelation of reproduction error signal 427 for the period measured by the selected period sensor is determined. As discussed below with reference to decision step 445, when control returns to step 430 from decision step 445, if step 443 was executed, the autocorrelation of the adjusted reproduction error signal, not reproduction error signal 427, is determined for the period measured by the selected period sensor. Each time through the loop removes zero or one error signals in a depth-first approach. Step 430 is followed by decision step 435.

Referring to FIGS. 5A-5B, autocorrelation signal 550 of reproduction error signal 510 can be determined by shifting signal 510 by one sample at a time, and taking the inner product of signal 510 with the shifted signal. This is repeated for successive shifts of one sample, two samples, ..., up to one less than the number of samples. FIG. 5B shows the results of the successive inner products (ordinate) plotted against the successive shifts (abscissa), starting from zero.

In various embodiments, successive shifts of five samples, seven samples, or another number of samples can be used. Shifts can be positive or negative. To perform the inner product, the number of samples is extended by the number of samples shifted, since both vectors being multiplied in an inner product have the same length. This can be done by zero-padding the vectors or by concatenating the vectors with themselves. In the example shown in FIG. 5B, zero-padding was used, so the amplitude of successive peaks 561, 562, 563, 564 decreases in that order.

In this example, the selected period sensor indicates a period of 256 samples. The autocorrelation can be determined for the single point 555 corresponding to that period by performing a single shift and inner product. Alternatively, the autocorrelation can be performed for a range of shifts around the period from the period sensor, or for the full signal 510. The autocorrelation is always highest at a shift of 0, shown in FIG. 5B as peak 561.

Referring back to FIG. 4, decision step 435 decides if the determined autocorrelation exceeds a selected threshold. If it does, the next step is step 440. If not, the next step is step 445. In this example, the magnitude of signal 550 at point 555 (in this example, 107.2 at 256 samples) is compared to threshold 570 and found to exceed it. When the magnitude exceeds the threshold, a processor in or cooperating with LCU 99 (FIG. 1), or an offline compensation processor with access to required data, as discussed herein, determines that an error term of the corresponding period is present in the signal. Note that in this example, peak 562 is not exactly at the 256-sample shift indicated by the period sensor, but instead at 257 samples of shift. This is a normal effect and is due to noise and jitter in signal 510. The value of the autocorrelation is tested at the period determined by the period sensor (point 555, here 107.2 at 256 samples of shift), not necessarily at a local maximum of signal 550 (e.g., peak 562, here 107.4 at 257 samples of shift). Threshold 570 can be determined during design or pre-manufacturing testing of a model of printers, or can be determined for an individual printer.

In various embodiments, threshold 570 is determined before production by statistical testing. The distribution of noise in prints produced by the printer is determined. For example, the noise can be white, Gaussian, Poisson, or another distribution. This distribution represents the expected signal 510 in the absence of non-uniformities. The reference noise distribution is determined and stored accessible to the processor. Different reference noise distributions can be stored and used for different printing conditions, e.g., different toner types or media types. These can be predetermined or trained so that the processor selects the correct reference noise distribution for the print conditions of each job or receiver.

In operation, the processor determines the autocorrelation of signal 510. The processor then compares the parameters of the distribution of values in the autocorrelation with the parameters of the reference noise distribution. For example, the mean and standard deviation of the data can be compared to a stored mean and standard deviation of the reference noise distribution. If the difference in either parameter exceeds a selected level, e.g., 50%, the processor determines that a variation is present. The processor then determines the location of peaks in autocorrelation 550 and compares those peaks to the determined periods from the period sensors to determine which members are producing variations in signal 510. A Fourier transform can also be used, but an autocorrelation permits more readily detecting errors commonly encountered in printers, such as flat spots in rollers that produce a wide frequency spectrum but a clear autocorrelation peak. A control chart can also be used.

In step 440, reproduction error signal 427 is decomposed at the corresponding period (e.g., 256) to determine a respective member-variation signal. Step 440 is followed by step 443, in which the determined respective member-variation signal is removed from reproduction error signal 427 to produce an adjusted reproduction error signal and respective adjusted member-variation signals that can include gains.

To accomplish the decomposition (step 440) and removal (step 443), signal 510 (FIG. 5A) is divided into a plurality of fragments (e.g., fragments 521, 522, 523, 524), each of length equal to the period. The fragments 521, 522, 523, 524 are arranged as columns of a matrix (in this example, 256×4). Rows can also be used. The singular value decomposition (SVD) of the matrix is then taken to determine the first singular vector (256×1). This vector represents the components of signal 510 that are common to all the fragments. The first singular vector is then concatenated with itself to the length of signal 510 (here, four times, resulting in a 1024×1 vector) to form the member-variation signal. The inner product of the member-variation signal and signal 510 is then computed to determine a scale factor. The member-variation signal is multiplied by the scale factor to form the adjusted member-variation signal. This completes the decomposition.

The adjusted member-variation signal is then removed from signal 510 by subtracting it therefrom. The result of the subtraction is the adjusted reproduction error signal. The member-variation signal can also be removed, and before subtracting, a gain can be applied to the respective member-variation signal. The results of removing the respective member-variation signals (or a selected subset thereof) are an adjusted reproduction error signal (the result of the subtractions) and respective adjusted member-variation signals (the data subtracted, including any gains). Step 443 is followed by decision step 445.

Decision step 445 decides whether there are more period sensors whose measurement data is to be processed. If not, adjusted reproduction error signal 450 is provided to step 455. If so, the next step is step 430, and steps 430-443 are repeated for the next selected period sensor. As discussed above, this is a depth-first approach; a breadth-first or combination approach can also be used. As discussed above with reference to step 430, in various embodiments using depth-first approaches, each time steps 430-443 are repeated, the most recent adjusted reproduction error signal is used in place of reproduction error signal 427.

The result of steps 430-445 is adjusted reproduction error signal 450 from which error terms due to measured rotatable members have been removed. As a result, adjusted reproduction error signal 450 provided to step 455 represents variation in the output of the printer that does not have a cause directly related to the period of a measured rotatable imaging member.

Steps 455-470 are performed one or more times to successively identify additional variations so that they can be compensated for. These are characterized by remaining-variation signals. A depth-first approach is shown for steps 455-470, but a breadth-first or combination approach can also be used.

In step 455, a remaining-variation signal is separated from adjusted reproduction error signal 450. The remaining-variation signal has a respective significance. (In embodiments in which this step is performed multiple times, adjusted reproduction error signal 450 is successively separated into one or more remaining-variation signals, each having a respective significance. More than one remaining-variation signal can also be separated out in step 455.) As discussed below with respect to decision step 470, when control returns to step 455 from decision step 470, the remaining-variation signal is separated from the result of step 465. In various depth-first embodiments, each time through the loop, zero or one remaining-variation signals are separated from the adjusted reproduction error signal. The remaining-variation signals can be separated starting from the lowest-frequency term and moving to the highest-frequency term. This permits detecting complex waveforms having a base frequency and several higher frequencies or overtones.

In various embodiments, separation includes identifying frequencies present in adjusted reproduction error signal 450, selecting a frequency of interest, and extracting the portion of adjusted reproduction error signal 450 corresponding to the identified frequency.

In an example, separation is performed by first transforming the adjusted reproduction error signal from the spatial domain to the frequency domain using a Fourier transform (e.g., an FFT). The result of the transform is magnitude vs. frequency and phase vs. frequency. Peaks can be found in the resulting magnitude spectrum and each peak presumed to correspond to an error term. This is the identifying step. One of the peaks can then be selected (in descending order of magnitude, or in another order); this is the selecting step. The selected frequency corresponds to a selected period. In other embodiments, the frequency terms can be identified from the autocorrelation performed in step 430.

To extract the relevant portion, adjusted reproduction error signal 450 is divided into fragments, each having a length corresponding to the selected period. This is as described above for decomposition (step 440). The fragments are assembled as columns of a P×F matrix, where P is the selected period (in samples) and F is the number of fragments. A matrix decomposition is then used to extract the portion of adjusted reproduction error signal 450 corresponding to the identified frequency.

In an embodiment, singular-value decomposition is used. This is as described above with respect to step 440, except that a frequency identified from the adjusted reproduction error signal's Fourier transform is used to select the period instead of the period from a period sensor.

In another embodiment, independent-component decomposition is used. Unlike the SVD, in which each singular vector has zero correlation with the other singular vectors, independent-component decomposition assumes that signal and noise are independent but not necessarily non-correlated. This can be useful, e.g., when noise does not have a Gaussian distribution. Independent-component decomposition can be performed by determining a cost function depending on the distribution of the noise. The cost function is used to measure the independence of two possible components, and mathematical optimization is performed to determine maximally-independent components. Further details can be found in Pierre Comon (1994): "Independent Component Analysis: a new concept?," *Signal Processing*, Elsevier, 36(3):287-314, incorporated herein by reference.

In another embodiment, positive-matrix decomposition is used. This technique can be used when all the values in the adjusted reproduction error signal are non-negative, and produces all-positive components. As a result, this decomposition can be useful with standard reflection scanners, in which the light received by the sensor is between zero and the incident light. When fluorescent inks are being used, the light is zero or more. This decomposition can be used to identify the most significant contributor to a particular effect. Further details can be found in "Positive matrix factorization: A non-negative factor model with optimal utilization of error estimates of data values" by Pentti Paatero and Unto Tapper, in *Environmetrics*, Volume 5, Issue 2, pages 111-126, June 1994 (presented at the Fourth International Conference on Statistical methods for the Environmental Sciences 'Environmetrics', Aug. 17 to 21, 1992, Espoo, Finland; DOI 10.1002/env.3170050203), incorporated herein by reference.

In another embodiment, a discrete cosine transform (DCT) is used. The DCT fits the reproduction error signal to a combination of a number of sinusoidal basis functions.

The result of this decomposition is a remaining-variation signal separated from the adjusted reproduction error signal. The remaining-variation signal has a respective significance. In various embodiments, significance is correlated with the perceptibility to a human of the error caused by that remaining-variation signal. The significance of each remaining-variation signal is also described below. Step 455 is followed by decision step 460.

In an example, the Fourier-transformed magnitude is approximated with a smooth spline, e.g., a cubic spline S. The Fourier-transformed magnitude is even, i.e., $|F(f)|=|F(-f)|$ for Fourier-transform result F and frequency f. Then S is subtracted from F, leaving X, which is a magnitude spectrum similar to white Gaussian noise, except that significant frequencies are still evident as local maxima. The local maxima are detected using a numerical threshold stored in non-volatile memory. The threshold can also be selected by using a statistical process, e.g., by computing the standard deviation stdev(X) of X and setting the threshold to k×stdev(X) for a selected constant k. The k constant sets the sensitivity and thus the probability of false positives and negatives. Increasing k increases in the false-negative rate and decreases the false-positive rate, and the other way around for decreasing k.

In another example, the threshold is set as a visual threshold. Each adjusted reproduction error signal value maps to exactly one density error value. The threshold is therefore set at the adjusted reproduction error signal value corresponding to the threshold of a typical viewer's visual discrimination on the test target or on typical content printed by the printer. For example, if the printer produces primarily grayscale artwork, the threshold can be set at the equivalent of $1.0\Delta E_{00}$, which is a just-noticeable difference (JND) in the CIEDE2000 error-measurement system defined in CIE Pub. 15:2004 ($3^{rd}$ ed.).

Decision step 460 decides whether the significance of the separated remaining-variation signal exceeds a selected threshold. The threshold can be a $\Delta L^*$ limit, e.g., $<3\Delta E^*$ or density change or percentage density change limit, e.g., <0.05 density. The threshold can be adjusted according to requirements for a particular print job. If the significance of the remaining-variation signal is above the threshold, the next step is step 465. If not, the next step is step 470.

In step 465, the adjusted reproduction error signal is modified by removing that remaining-variation signal from the adjusted reproduction error signal. Removal can be performed as described above with respect to step 443. Using the inner product to compute a scale factor is optional. Some decompositions require the use of a scale factor or other gain adjustment, as known in the art. This produces a respective adjusted remaining-variation signal, which includes any gain terms applied before subtracting the respective remaining-variation signal from the adjusted reproduction error signal. In embodiments in which steps 455-470 are repeated, successive remaining-variation signals are removed from the adjusted reproduction error signal. Step 465 is followed by decision step 470.

In some embodiments, remaining-variation signals are separated all at once in step 455 (breadth-first). In others, remaining-variation signals are separated one at a time (depth-first).

Decision step 470 decides whether to try to separate another remaining-variation signal. If so, the next step is decision step 460. If not, the next step is step 475. As a result, the separating and modifying steps (steps 455-465) are repeated, each time using the result of the last loop, until no remaining-variation signal has significance exceeding the selected threshold.

In step 475, a correction signal is automatically produced using the adjusted member-variation signals and the adjusted remaining-variation signals using a processor. The correction signal can be produced using multiple adjusted member-variation signals to compensate for errors or nonuniformities introduced by multiple imaging members. Each correction signal has an amplitude, which is related to the visibility of the effect of applying that correction signal. In various embodiments, each amplitude is a value correlated with the magnitude of density, luminance, or $L^*$ of the variations corrected by applying the corresponding correction signal. In other embodiments, each amplitude is a value correlated with the visual significance of the variations corrected by applying the corresponding correction signal. Step 475 is optionally followed by step 480.

In an example, the correction signal includes digital values (positive, negative, or zero) to be added to the exposure data values to the exposure unit to compensate for the errors. In other embodiments, the correction signal includes values indicating that certain pixels should be exposed at a different location on the receiver than normal. For example, a pixel can be moved in the in-track direction by advancing or delaying the time at which the exposure unit begins to emit light corresponding to that pixel. The correction signal can also include values indicating that voltages or other physical parameters of the printer should be changed. The correction signal can apply to each cross-track position, or only to some cross-track positions, and can vary with time or with the phase of various members in the printer (e.g., those measured by period sensors).

In an embodiment, the correction signal includes exposure modification values. These are computed by inverting the error terms of the various member-variation signals and remaining-variation signals, or by inverting the overall error signal. E.g., in a DAD system, if a pixel is too bright (is overly-reflective), exposure is increased. The correction signal therefore includes positive values for overly-bright pixels to increase their exposure and reduce their reflectance.

In various embodiments useful with EP printers, the correction signal includes one or more specification(s) of, or adjustment(s) to, the voltage of the primary charger or the bias of the toning station. These can be used together with exposure modification values to provide increased correction range. These can be used to compensate for banding artifacts and other artifacts extending in the cross-track direction.

In various embodiments, de-screening is performed on the scanned data of the printed test image before measuring its densities. De-screening can be performed using, e.g., a Gaussian filter.

In various embodiments, a multilevel streak extraction process is performed on each variation signal. A spline function having a non-uniform knot placement is used to model the overall density fluctuations at each density level. Streak signals are the difference between the profiles and the fitted spline curves in an embodiment. Streak signals can be represented in the code-value space and its logarithmic space.

The streak signals are decorrelated using a singular value decomposition. The first component is extracted as the correction profile and the remaining signal used to refine the correction profile to better address fine and sharp edges in an embodiment. The correction gain is produced by linearly fitting the streak signal on the extracted correction profile in the logarithmic space. The slope is used as the correction gain coefficient.

In various embodiments, the measured densities in each variation signal are plotted against the aim densities. This mapping is then inverted, and optionally smoothed, to provide a correction signal that maps aim density to the modified density to command from the printer. Further details of this and other embodiments are given in commonly-assigned U.S. Publication No. 2012/0269527; U.S. Publication No. 2012/0268544; and U.S. Publication No. 2011/0235059, Sep. 29, 2011, now U.S. Pat. No. 8,482,802; all of which are incorporated herein by reference.

In optional step 480, the correction signal is applied to the image data to produce corrected image data. This can be performed while each row of image data is being supplied to the exposure unit, or as a pre-processing step. Step 480 is followed by step 490.

In optional step 490, the corrected image data is printed using the printer. The printer can be an EP printer, as described above with reference to FIG. 1, or an inkjet, thermal, or other printer.

Figure 6:
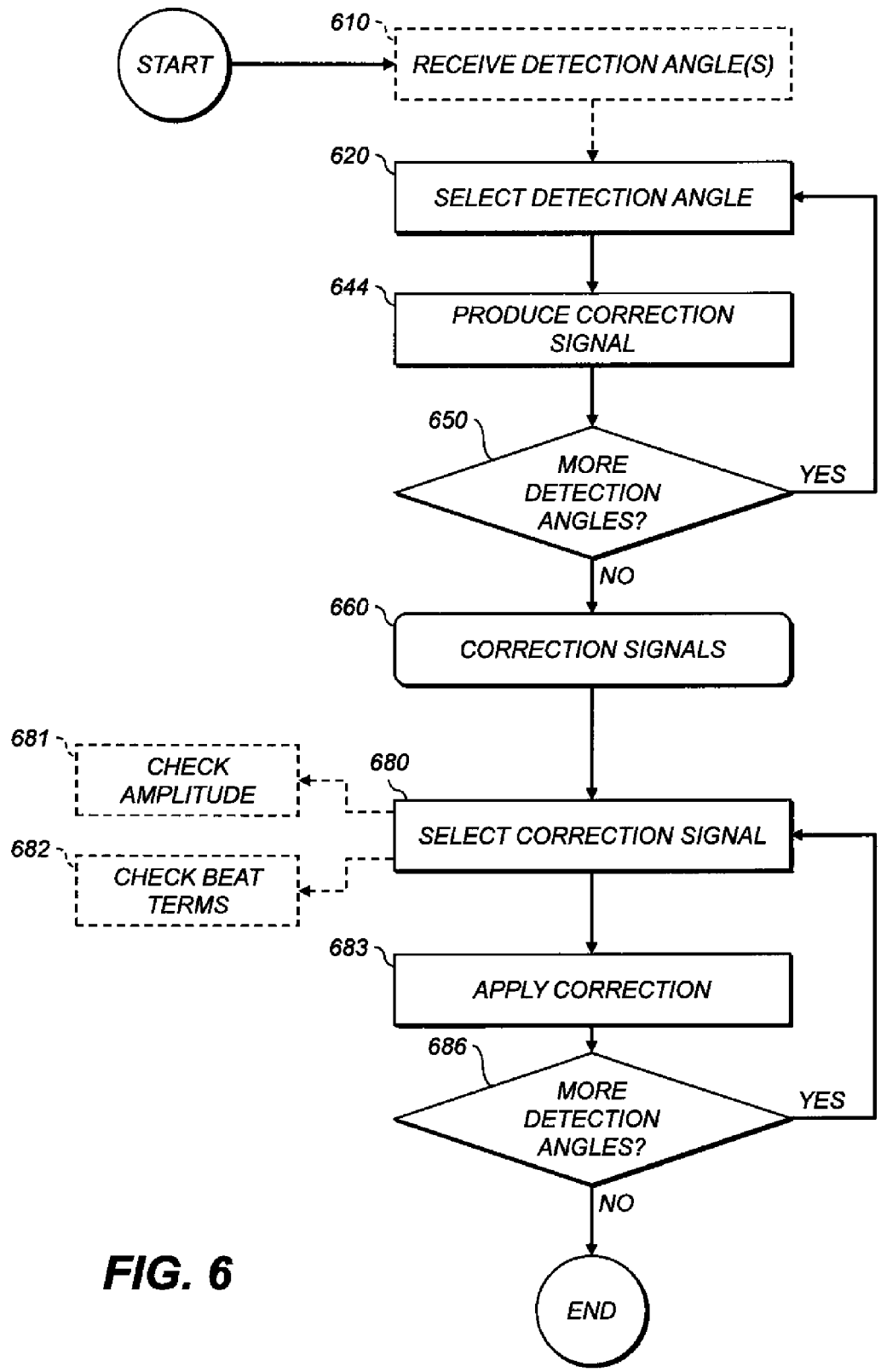
FIG. 6 shows various embodiments of methods of producting correction data for a printer.

FIG. 6 shows various embodiments of methods of producing correction data for a printer. Processing begins with optional step 610 or with step 620.

In optional step 610, an indication is received through an input interface of one or more detection angles. The input interface can be part of user interface system 330 (FIG. 3). The detection angles are those angles at which the print will be scanned for nonuniformities. As used herein, an angle of 0° is cross-track, increasing clockwise (when viewing a printed page) to 90° for in-track. For example, to detect bands (streaks extending in the cross-track direction), a detection angle of 90° can be used. This will show variations down the in-track direction caused by the bands. In various embodiments, the detection angles are preferably different from each other by at least 20°, or at least 30°, or at least 45°, or approximately 90°. This reduces confounding between multiple detection angles. Detection angles can be provided, or stored, based on the types of defects determined to be commonly produced by the printer. In various embodiments, the set of detection angles includes an angle orthogonal to the direction of extent of each defect class identified before production begins. For example, if the exposure unit's placement is not correct, the exposure frequency and halftone frequencies interact to produce a defect extending across the receiver at a diagonal. A detection angle across the direction of extent of this defect can be used to detect the defect. In this example, when the exposure unit (e.g., exposure subsystem 22 shown in FIG. 1) is out of position, the focus position changes. This changes the positions of the individual dots of the visible image, increasing moiré interference between colors and producing low-frequency beat terms. This defect can be especially visible in light colors. Step 610 is followed by step 620.

FIG. 7A shows an example of a printed receiver with streaks 701. The spacing of the lines represents the density of the print on a print that should be a uniform field (evenly-spaced lines). The streaks extend in the in-track direction (90°, shown by the dashed arrow), so detection direction 720 is at a detection angle of 0°. Information about the streaks can also be acquired from any measurement direction other than 90°. For example, detection direction 720 is at a detection angle of 45°. The farther detection direction 720 is from 90°, the more the measurements will reflect only the effect causing the streaks, and not other effects as well.

FIG. 7B shows an example of a printed receiver with bands 702. The bands extend in the cross-track direction (0°), so detection direction 730 is at a detection angle of 90°. As in FIG. 7A, any detection direction 730 will give some information about the bands.

In another example, in an EP printer using a cleaning brush to clean photoreceptor 25 (FIG. 1), the bristles of the brush preferably provide uniform nap height. That is, the respective distances between the rotational axis of the cleaning brush and the far end of each bristle should all be the same. If they are not the same, and the axis of the cleaning brush is not parallel to the axis of photoreceptor 25, a diagonal artifact can be produced on prints because toner not cleaned off the photoreceptor can transfer to the print and result in extra density on the print. Other causes of diagonal artifacts can include a member's having a conical shape instead of an intended cylindrical shape, or a member's precessing at one end as it rotates.

Referring back to FIG. 6, in step 620, a detection angle is selected. The selected angle can be an angle that was received in step 610, or another angle, e.g., 0°, 45°, or 90°. Step 620 is followed by step 644.

In step 644, a correction signal is produced using the selected detection angle from step 620. For example, steps 420-475 shown in FIG. 4 can be performed to produce a correction signal for the selected detection angle. Step 644 is followed by step 650.

Decision step 650 decides whether there are more detection angles to be processed. If so, the next step is step 620. If not, the next step is step 660. Not all received correction angles need to be selected and processed. The result is a set of correction signals 660, which are the correction signals for the plurality of respective detection angles. Signals 660 are provided to step 680.

In step 680, one of the respective correction signals is selected. The correction signals can be selected in any order. In various embodiments, correction signals are selected in descending order of amplitude (as discussed above with respect to step 475 shown in FIG. 4) to mitigate image degradation as multiple corrections are applied. Step 680 can include optional steps 681 or 682, and is followed by step 683.

In various embodiments, any given correction signal is not selected if its amplitude is below a selected amplitude threshold of visual sensitivity, or is selected if its amplitude is above the selected amplitude threshold. The amplitude is checked in optional step 681. The threshold can be included in the cutoff or not (less-than or less-than-or-equal can be used, and likewise greater-than or greater-than-or-equal). For example, the errors corrected by a correction signal with an amplitude of $0.05\Delta L*$ are very unlikely to be visible to a human viewer looking at a print on a receiver. Accordingly, that correction signal is not selected. This reduces the probability of introducing additional variations in the print due to interactions between correction signals.

In various embodiments, each correction signal has one or more corresponding characteristic frequencies. These frequencies are the characteristic frequencies of the corresponding defect, and can be identified from the Fourier transform, as discussed above with respect to steps 430 and 455 shown in FIG. 4. Even if the amplitude of a particular correction signal is below the threshold, that correction signal is still applied if the beat frequencies between the characteristic frequencies of that correction signal and those of another correction signal have expected amplitudes above the threshold of visibility. The beat-frequency terms are checked in optional step 682. Specifically, a particular correction signal is selected if a beat term between one of the characteristic frequencies of the particular correction signal and one of the characteristic frequencies of a selected correction signal different from the particular correction signal has an amplitude exceeding the selected amplitude threshold.

For example, P. Barten, *Contrast Sensitivity of the Human Eye and its Effects on Image Quality* (ISBN 0-8194-3496-5; SPIE 1999), describes the contrast-sensitivity function of the human eye. Modulation is defined as the ratio of the amplitude of a luminance sine wave to its average value. Contrast sensitivity is the reciprocal of the lowest modulation at which there is a 50% probability that the sine wave is visible as a sine wave. In a two-alternative forced-choice experiment, this corresponds to 75% of the participants correctly selecting the test target containing the sine wave. Barten FIG. 3.4 curve e shows the contrast sensitivity for a field of 10° with a luminance of 100 nits. Two signals at a modulation of 1% (100 on the ordinate) at 40 and 42 cyc/deg., respectively, will not be discernable with 50% probability; the probability will be less. The points (40,100) and (42,100) are above curve e. However, the beat term at frequency 42−40=2 cyc/deg., with envelope amplitude 1%+1%=2% (50 on the ordinate) will be clearly visible. In this example, correction signals for the 40 cyc/deg. variation and the 42 cyc/deg. variation should both be applied to the image data, even though neither alone meets the threshold.

In step 683, the selected correction signal from step 680 is applied to the image data. This can be performed as discussed above with respect to step 480 (FIG. 4). Step 683 is followed by decision step 686.

Decision step 686 decides whether there are more detection angles to be applied. If so, the next step is step 680. In this way, as steps 680-686 are repeated, two or more (up to all) of the respective correction signals are selected, and each of the selected respective correction signals is used in turn to produce the corrected image data. The first correction is applied to the original image data and each subsequent correction is applied to the result of the previous correction. This is a depth-first approach; a breadth-first approach, in which correction signals 660 are combined and then the combination is applied to the image data, can also be used. Not all correction signals 660 need to be applied, so step 686 determines that no correction angles remain to be applied when the only unapplied correction angles are not selected for application, e.g., because of low amplitude, as discussed above.

Figure 8:
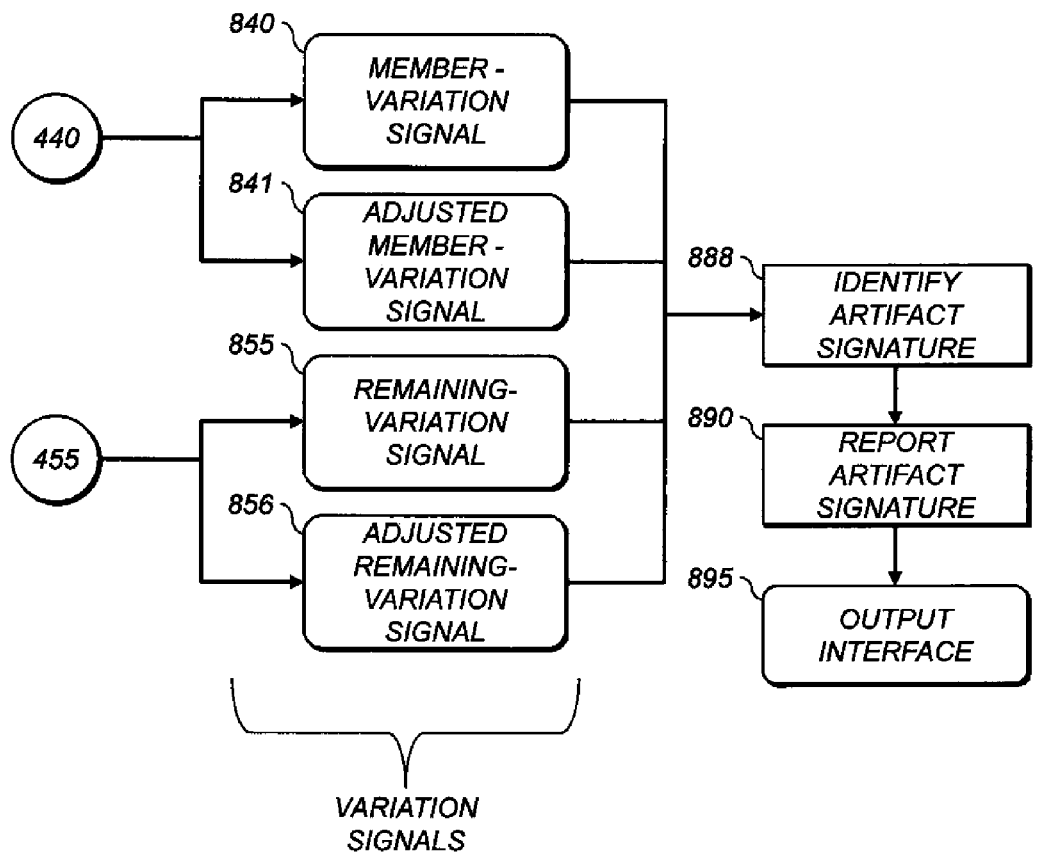
FIG. 8 shows various embodiments of methods of identifying artifacts in a printed test image.

FIG. 8 shows various embodiments of methods of identifying artifacts in a printed test image. Steps 440 and 455 are as shown in FIG. 4. Step 440 produces member-variation signal 840 and adjusted member-variation signal 841. Step 455 produces remaining-variation signal 855 and adjusted remaining-variation signal 856. Each of these is an example of a variation signal, as discussed above. At least one of the variation signals is provided to step 888.

In step 888, an artifact signature is automatically identified by a processor from the received variation signal(s) (member-variation signal 840, adjusted member-variation signal 841, remaining-variation signal 855, or adjusted remaining-variation signal 856). Step 888 is followed by step 890.

In an example, the artifact signatures are entries in a diagnostic table that relates frequency of the variation signal or location of local minima or maxima of the variation signal to the member(s) or printer component(s) that can cause artifacts at that frequency or location. The members listed in the table can be rotatable or stationary (e.g., skives). These can be particularly useful in analyzing streaking errors (e.g., FIG. 7A) caused by components that do not extend across the full width of the receiver in the cross-track direction, such as blocks of LEDs in exposure subsystem 22, discrete, laterally-spaced skives on fusing roller 62, and ports through which toner is moved from auger 23b (FIG. 1) to toning station 23. In various embodiments, a table can also be used for banding errors that extend along the in-track direction (e.g., FIG. 7B). Frequency, period, distance between components, or time for the receiver to travel between components can be used interchangeably, with suitable conversions based on known speeds of receiver transport in the printer. The table can also be indexed by multiple frequencies that sum to (beat at) the frequency of the variation signal. For printers having multiple print speeds, the diagnostic table can contain entries for all frequencies at all print speeds, or multiple tables can be used (one per print speed), or the frequencies in the table can be shifted by an offset corresponding to the print speed.

The table can be used to determine which member is causing an error even if that member does not have a period sensor, since the table can be programmed with all known relationships between components' frequencies. For example, if multiple components are driven by a gear train, they have fixed ratios between their frequencies. If any one member in the gear train has a period sensor, the periods for the other members can be derived from the measured period for that member, and the table populated accordingly. The table can be populated at manufacturing time, or updated dynamically based on period-sensor measurements.

Figure 9:
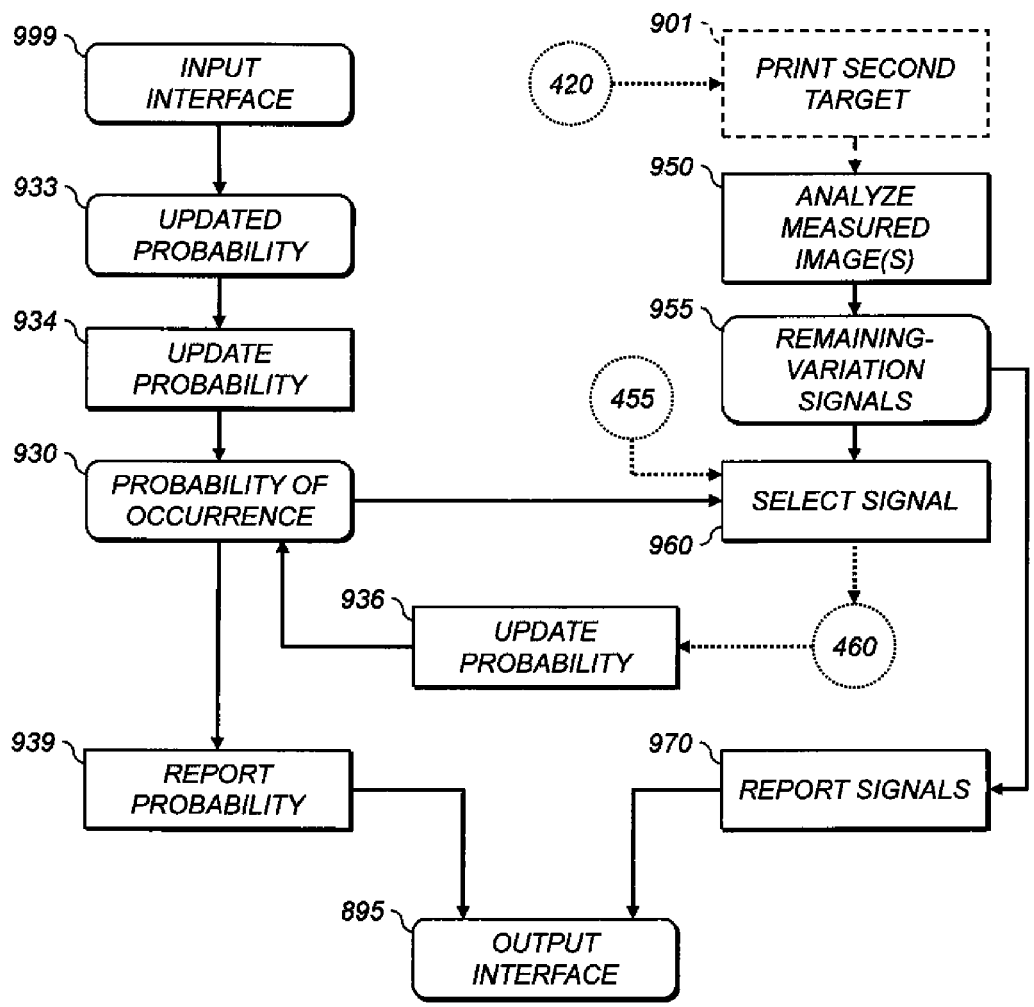
FIG. 9 shows various embodiments of methods of producing correction data for a printer.

In various embodiments, the table can receive new entries through input interface 999 (FIG. 9). A service technician who locates and repairs a member that exhibited a remaining-variation signal can update the table to associate the repaired member with the frequency of the remaining-variation signal.

In step 890, the identified artifact signature is reported using output interface 895. Output interface 895 can be a computer display, a network connection, a log file, or another way of transmitting information about the intended artifact, whether to a human operator or to another computer or processor.

FIG. 9 shows various embodiments of methods of producing and updating correction data for a printer. Steps 950 and 960 relate to decomposing step 440 and separating step 455 (both FIG. 4). Additional steps are shown for updating probabilities (interface 999 through probability 930, and step 936) and reporting probabilities or remaining-variation signals (steps 939 and 970, and output interface 895). These functions can be performed individually or in any combination.

In step 950, the measured image from step 425 (FIG. 4) is analyzed. This can be performed using steps 430-470 (FIG. 4). Step 950 produces variation signals 955 (decomposed member-variation signals from step 440 and separated remaining-variation signals from step 455), which are provided to step 960 and step 970.

In optional step 970, one or more of the variation signals is reported through output interface 895. This permits tracking the history of errors in the printer over time. In various embodiments, each period sensor measures a member with a different period. The period then can be used to compensate and for diagnostics. In other embodiments, at least two period sensors measure members with the same periods (within the tolerances of the sensors). The data can be used to compensate, but diagnostics cannot identify which of the two components is introducing errors unless other data are used. This is discussed further below with respect to step 901.

Diagnostics can be performed by correlating the frequency of each remaining-variation signal with known defects in members rotating at specific frequencies. Also, the location and direction of extension of the defect (in-track, cross-track) can indicate the probable cause. In an example, rollers produce defects only in certain places (e.g., flat spots). Variations extending in-track are therefore not roller errors. In another example, charger defects can produce streaks (extending in-track) that are light and have a dark surround. These streaks can be compared to streaks from known types of charger errors, such as a contaminant on the charger wire. The variation signal can be compared with a catalog of signals to determine the source of the problem. The catalog can be indexed by size or amplitude. In an example, charger streaks can be of various widths on the receiver, wide or narrow, and the catalog includes entries for both.

In some embodiments, each variation signal 955 produced in step 950 has a respective probability 930 of occurrence. For example, if every print produced by a particular printer exhibited the r(n) pulse shape described in Eq. 1, above, the probability of occurrence of r(n) would be 1.0. For example, toning-station shell runout can be a common variation, so can have a higher probability. Likewise, magnetic core rotational speed can be a common variation, as can transport-web speed variation. As indicated by the dotted arrows, step 960 can be performed as part of separating step 455 (FIG. 4), before threshold-testing step 460 (FIG. 4). In step 960, variation signals 955, and specifically remaining-variation signals, are selected for testing in step 460 (FIG. 4) in an order based on their respective probabilities 930 of occurrence. In step 936, the respective probability 930 of occurrence of the selected variation signal 955 is then updated using the determined significance from step 460 (FIG. 4) of errors represented by the selected variation signal 955. Step 936 can also be performed to update the probabilities 930 of member-variation signals based on the autocorrelation from step 430 (FIG. 4) or the determination of threshold from step 435 (FIG. 4). This provides the processor with up-to-date information about which errors are most likely to occur, so that correction efforts can be prioritized thereto. In optional step 939, one or more of the respective probabilities 930 of occurrence is reported through output interface 895.

In some embodiments, update 933 to one of the respective probabilities 930 of occurrence is received through input interface 999. In step 934, respective probability 930 of occurrence is updated using update 933. The processor stores variation signals 955, or signatures thereof, together with their associated probabilities. A signature can be a center frequency and tolerance, or a frequency after adjustment for print speed, as discussed above with respect to the diagnostic table. Step 960 can select a variation signal 955 by matching the variation signals 955 against the stored signals or signatures and retrieving the corresponding stored probabilities. Signals with higher probabilities, or new signals that do not match any stored signals, can then be selected. In embodiments, signals not matching any stored signals are selected first, since they can represent new problems that the printer is developing as its components age.

In various embodiments, step 960 includes testing the selected remaining-variation signal before providing it to step 460. If the significance of the selected remaining-variation signal exceeds a selected, stored threshold, that fact can be reported using output interface 895, and the remaining-variation signal can be discarded. In these embodiments, if the printer is not able to compensate for a particular variation, it refuses to do so and reports that fact, rather than producing prints that evidence the variation.

Input interface 999 is an input interface, such as a keyboard or other human-interface device for receiving input from a printer operator, or a network or other bus interface (e.g., Ethernet, USB, or PCI) for receiving information from a computer or processor. Output interface 895 is as shown in FIG. 8.

In some embodiments, print second target step 901 is performed as part of step 420 (FIG. 4), the printing of the test image. This can be used to determine which member is causing an error in systems in which several members have the same or similar periods. In an example of an EP printer, the rotational speed of transport web 81 (FIG. 1) varies at 7 Hz (plus or minus tolerances) and the rotational speed of one or more augers 23b (FIG. 1) associated with toning station 23 (FIG. 1) is 7.2 Hz (plus or minus tolerances). Noise of >0.1 Hz will therefore make it difficult to distinguish which of these two is causing a remaining-variation signal at approximately 7 Hz in a first test target. To determine which member is causing the effect, the speed of rotation of the augers is changed, e.g., to 4 Hz or 10 Hz and a second test target is printed (step 901). Both targets are analyzed in step 950. If the remaining-variation signal at 7 Hz is still present in the second test target, the augers are not the cause, so transport web 81 can be presumed to be the cause.

Specifically, in these embodiments, the frequency of one of the rotational members is changed and a second test target is printed. Measuring step 425 (FIG. 4) includes measuring both test targets. Two reproduction error signals 427 are therefore produced. Subsequent steps 430-470 include analyzing measurements for both test targets. Correction step 475 further includes comparing the member-variation signals, adjusted member-variation signals, remaining-variation signals, or adjusted remaining-variation signals to determine for which variation signals to produce correction data. In the example above, a correction signal would be produced for the variation of the web, but not the variation of the augers.

FIG. 10 is a graphic representation of a test target useful with various embodiments. The target shown has enlarged alignment marks, as described in commonly-assigned U.S. Publication No. 2010/0097657, Apr. 22, 2010, now U.S. Pat. No. 8,493,623., incorporated herein by reference. As shown, target 1000 includes multiple uniform density images and two different types of alignment marks. The uniform density images vary in tone from a darker tone uniform density image 1002 to a lighter tone uniform density image 1004. Alignment marks 1006, 1008 (shown enlarged for easier visibility) are used to correlate the location of the printed mark to a pixel location from exposure subsystem 22 (FIG. 1). Alignment mark 1006 has a unique shape to permit the processor to use scanned data regardless of the orientation of the printed target on the scanner. The processor can locate alignment mark 1006 and rotate the scanned image to place alignment mark 1006 in a specific location in the image data.

When exposure subsystem 22 is an LED printhead, the alignment marks can be used to locate the exact LED array locations on the printhead. The correction can be tuned for any one of the given tone densities. For example, in one embodiment, the correction is tuned for a mid-tone density. Other embodiments of test targets can be used, such as KODAK ICS targets or other targets with density bars, flat field targets, registration targets (which include multicolor bars), large-patch checkerboard test targets, or small-patch checkerboard targets (e.g., every other pixel printed and the rest not, or one-on, two-off).

The invention is inclusive of combinations of the embodiments described herein. References to "a particular embodiment" and the like refer to features that are present in at least one embodiment of the invention. Separate references to "an embodiment" or "particular embodiments" or the like do not necessarily refer to the same embodiment or embodiments; however, such embodiments are not mutually exclusive, unless so indicated or as are readily apparent to one of skill in the art. The use of singular or plural in referring to the "method" or "methods" and the like is not limiting. The word "or" is used in this disclosure in a non-exclusive sense, unless otherwise explicitly noted.

The invention has been described in detail with particular reference to certain preferred embodiments thereof, but it will be understood that variations, combinations, and modifications can be effected by a person of ordinary skill in the art within the spirit and scope of the invention.

PARTS LIST

- 21 charger
- 21a voltage source
- 22 exposure subsystem
- 23 toning station
- 23a voltage source
- 23b auger
- 25 photoreceptor
- 25a voltage source
- 31, 32, 33, 34, 35, 36 printing module
- 38 print image
- 39 fused image
- 40 supply unit
- 42, 42A, 42B receiver
- 50 transfer subsystem
- 54 flag
- 55 photoreceptor
- 56 period sensor
- 57 intermediate transfer member
- 59 transfer backup member
- 60 fuser
- 62 fusing roller
- 64 pressure roller
- 66 fusing nip
- 68 release fluid application substation
- 69 output tray
- 70 finisher
- 81 transport web
- 86 cleaning station
- 99 logic and control unit (LCU)
- 100 printer
- 200 input pixel levels

PARTS LIST

Continued

- 205 workflow inputs
- 210 image-processing path
- 220 output pixel levels
- 250 screening unit
- 260 screened pixel levels
- 270 print engine
- 310 data processing system
- 320 peripheral system
- 330 user interface system
- 340 data storage system
- 410 arrange imaging members step
- 415 arrange period sensors step
- 420 print test image step
- 425 measure printed image step
- 427 reproduction error signal
- 430 determine autocorrelation step
- 435 autocorrelation exceeds threshold? decision step
- 440 decompose reproduction error signal step
- 443 remove member-variation signal step
- 445 more sensors? decision step
- 450 adjusted reproduction error signal
- 455 separate remaining-variation signal from error signal step
- 460 significance exceeds threshold? decision step
- 465 remove remaining-variation signal step
- 470 significant remaining-variation signals remain? decision step
- 475 produce correction signal step
- 480 correct image step
- 490 print corrected image step
- 510 reproduction error signal
- 521, 522, 523, 524 fragments
- 550 autocorrelation signal

PARTS LIST

Continued

- 550 autocorrelation signal
- 555 point
- 561, 562, 563, 564 peaks
- 570 threshold
- 610 receive detection angle(s) step
- 620 select detection angle step
- 644 produce correction signal step
- 650 more detection angles? decision step
- 660 correction signals
- 680 select correction signal step
- 681 check amplitude step
- 682 check beat terms step
- 683 apply correction step
- 686 more detection angles? decision step
- 701 streak
- 702 band
- 710, 720, 730 detection direction
- 840 member-variation signal
- 841 adjusted member-variation signal
- 855 remaining-variation signal
- 856 adjusted remaining-variation signal
- 888 identify artifact signature step
- 890 report artifact signature step
- 895 output interface
- 901 print second target
- 930 probability of occurrence
- 933 updated probability
- 934 update probability step
- 936 update probability step
- 939 report probability step

PARTS LIST

Continued

- 950 analyze measured image step
- 955 variation signals
- 960 select variation signal step
- 970 report variation signal step
- 999 input interface
- 1000 target
- 1002 darker tone uniform density image
- 1004 lighter tone uniform density image
- 1006, 1008 alignment mark

The invention claimed is:

1. A method of producing correction data for a printer, comprising:
arranging a plurality of rotatable imaging members along a receiver feed path in the printer;
arranging one or more period sensors in operative arrangement with respective rotatable imaging members, the period sensors sensing a period and a phase of the respective rotatable imaging members;

printing a test image using the rotatable imaging members and simultaneously using the period sensors to record the respective periods and phases of the corresponding rotatable imaging members, the test image defining an aim density pattern;

measuring the printed test image along a selected measurement direction, determining a reproduced density pattern from the measurements, and determining a reproduction error signal using the aim density pattern and the reproduced density pattern;

a member-variation-determining step of, for each period sensor, determining a respective autocorrelation of the reproduction error signal for the corresponding period and, if the determined autocorrelation exceeds a selected threshold, decomposing the reproduction error signal at the corresponding period to determine a respective member-variation signal and removing the determined respective member-variation signal from the reproduction error signal to produce an adjusted reproduction error signal and a respective adjusted member variation signal;

a remaining-variation-determining step of, after the member-variation-determining step, separating the adjusted reproduction error signal into one or more remaining-variation signals, each having a respective significance;

a modifying step of, if the significance of any of the remaining-variation signals exceeds a selected threshold, modifying the adjusted reproduction error signal by removing that remaining-variation signal from the adjusted reproduction error signal and producing a respective adjusted remaining-variation signal;

repeating the remaining-variation-determining and modifying steps until no remaining-variation signal has significance exceeding the selected threshold; and a correction step of automatically producing a correction signal using the adjusted member-variation signals and the adjusted remaining-variation signals using a processor, wherein the correction signal varies with the determined phases of the rotatable imaging members having autocorrelations that exceed the selected threshold;

using the correction signal to print image data using the printer, thereby compensating for banding artifacts.

2. The method according to claim 1, further including:

repeating the measuring through correction steps for a plurality of selected detection angles to produce respective correction signals;

selecting two or more of the respective correction signals; and repeating the applying step using each of the selected respective correction signals in turn to produce the corrected image data.

3. The method according to claim 2, wherein each of the respective correction signals has a respective amplitude and one or more respective characteristic frequencies, and the selecting step includes selecting a particular one of the respective correction signals if:

the amplitude of the particular correction signal exceeds a selected amplitude threshold; or a beat term between one of the characteristic frequencies of the particular correction signal and one of the characteristic frequencies of a selected correction signal different from the particular correction signal has an amplitude exceeding the selected amplitude threshold.

4. The method according to claim 2, further including receiving through an input interface an indication of one or more of the selected detection angles.

5. The method according to claim 2, wherein the detection angles include 0° and 90°.

6. The method according to claim 2, wherein the detection angles include 45°.

7. The method according to claim 1, further comprising automatically identifying an artifact signature from the member-variation signals, adjusted member-variation signals, remaining-variation signals, or adjusted remaining-variation signals using the processor, and reporting the identified artifact signature using an output interface.

8. The method according to claim 1, wherein the remaining-variation-determining step includes decomposing the adjusted reproduction error signal using a discrete cosine transform to provide the remaining-variation signals.

9. The method according to claim 1, wherein each remaining-variation signal has a respective stored probability of occurrence, and the remaining-variation-determining step includes selecting remaining-variation signals in an order based on their respective probabilities of occurrence and adjusting the respective probability of occurrence of each remaining-variation signal using the determined significance of that remaining-variation signal.

10. The method according to claim 9, further including receiving an update to one of the respective probabilities of occurrence through an input interface and storing the updated probability.

11. The method according to claim 9, further including reporting one or more of the respective probabilities of occurrence through an output interface.

12. The method according to claim 1, wherein the remaining-variation-determining step includes transforming the adjusted reproduction error signal from the time domain to the frequency domain.

13. The method according to claim 1, wherein the printer is an electrophotographic printer.

14. The method according to claim 1, further including reporting one or more of the remaining-variation signals through an output interface.

15. The method according to claim 1, further including changing the frequency of one of the rotational members and printing a second test target, wherein the measuring step includes measuring both test targets and the subsequent steps include analyzing measurements for both test targets, and the correction step further includes comparing the member-variation signals, adjusted member-variation signals, remaining-variation signals, or adjusted remaining-variation signals to determine for which signals to produce the correction data.

* * * * *